United States Patent
Jang et al.

(10) Patent No.: US 12,128,931 B2
(45) Date of Patent: Oct. 29, 2024

(54) DRIVING MODE SWITCHING DEVICE AND DRIVING MODE SWITCHING METHOD

(71) Applicant: HL MANDO CORPORATION, Gyeonggi-do (KR)

(72) Inventors: Eun Ho Jang, Seoul (KR); Ki Sung Jo, Gyeonggi-do (KR); Hyun Jung Kim, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/767,811

(22) PCT Filed: Sep. 22, 2020

(86) PCT No.: PCT/KR2020/012787
§ 371 (c)(1),
(2) Date: Apr. 8, 2022

(87) PCT Pub. No.: WO2021/075745
PCT Pub. Date: Apr. 22, 2021

(65) Prior Publication Data
US 2024/0083466 A1   Mar. 14, 2024

(30) Foreign Application Priority Data
Oct. 14, 2019   (KR) .......................... 10-2019-0126608

(51) Int. Cl.
*B60W 60/00*   (2020.01)
(52) U.S. Cl.
CPC ..... *B60W 60/005* (2020.02); *B60W 2510/205* (2013.01); *B60W 2540/12* (2013.01); *B60W 2540/18* (2013.01)
(58) Field of Classification Search
CPC ......... B60W 60/005; B60W 2510/205; B60W 2540/12; B60W 2540/18
See application file for complete search history.

(56) References Cited

U.S. PATENT DOCUMENTS 10,481,602 B2 * 11/2019 Chandy ................. B60W 40/08
10,562,520 B2 *  2/2020 Nishimine ............ B60W 20/40
(Continued)

FOREIGN PATENT DOCUMENTS

KR   10-2016-0042563   4/2016
KR   10-2016-0089285   7/2016
(Continued)

OTHER PUBLICATIONS

International Search Report for PCT/KR2020/012787 mailed on Dec. 21, 2020 (now published as WO 2021/075745) with English translation provided by WIPO.
(Continued)

*Primary Examiner* — Tyler J Lee
(74) *Attorney, Agent, or Firm* — Womble Bond Dickinson (US) LLP

(57) ABSTRACT

The present disclosure relates to a driving mode switching device and a driving mode switching method. Particularly, the driving mode switching device according to the present disclosure comprises: a driving mode switching determination unit for determining to switch a driving mode of a vehicle to either an autonomous driving mode or a manual driving mode on the basis of at least one from among driving information, detection information, and driver detection information; and a driving mode switching unit for controlling a transition section in which the driving mode is switched and/or the ratio of turning control signals in the driving modes on the basis of at least one from among the driving information, the detection information, and the driver detection information when it is determined that the driving mode is to be switched, and switching the driving mode by changing the turning control signal.

22 Claims, 16 Drawing Sheets

(56) References Cited

U.S. PATENT DOCUMENTS

| | | | | |
|---|---|---|---|---|
| 10,780,915 B2* | 9/2020 | Rakouth | ................ | B62D 5/091 |
| 11,046,331 B2* | 6/2021 | Nagase | ............... | B60W 50/082 |
| 11,126,174 B2* | 9/2021 | Ming | ................. | B60W 30/182 |
| 11,192,554 B2* | 12/2021 | Okajima | ........... | B60W 60/0053 |
| 11,279,367 B2* | 3/2022 | Kim | ........................ | G10L 15/32 |
| 2017/0151950 A1 | 6/2017 | Lien | | |

FOREIGN PATENT DOCUMENTS

| | | |
|---|---|---|
| KR | 10-2017-0044526 | 4/2017 |
| KR | 10-2018-0061462 | 6/2018 |

OTHER PUBLICATIONS

Written Opinion of the International Searching Authority for PCT/KR2020/012787 mailed on Dec. 21, 2020 (now published as WO 2021/075745) with English translation provided by Google Translate.

* cited by examiner

DRIVING MODE SWITCHING DEVICE AND DRIVING MODE SWITCHING METHOD

CROSS-REFERENCE TO RELATED APPLICATIONS

This patent application is the national stage of International Patent Application No. PCT/KR2020/012787 filed on Sep. 22, 2020, which claims priority in accordance with Article 119 (a) of the U.S. Patent Law (35 USC § 119 (a)) for Patent Application No. 10-2019-0126608 filed in Korea on Oct. 14, 2019, which all contents are incorporated into this patent application by reference. In addition, if this patent application claims priority for countries other than the United States for the same reason as above, all the contents are incorporated into this patent application as references.

TECHNICAL FIELD

The present disclosure relates to a driving mode switching device and a driving mode switching method.

BACKGROUND ART

Recently, research on autonomous driving technology is being actively conducted. In general autonomous driving, road conditions such as surrounding vehicles, pedestrians, obstacles, lanes, and traffic signals are recognized through an advanced driving assistance system (ADAS), and the vehicle may autonomously drive based on the recognized information.

Autonomous driving can be divided into partial autonomous driving, conditional autonomous driving, highly autonomous driving, and finally fully autonomous driving according to its level. At any level, there is a need to switch the driving mode from autonomous driving to manual driving. The need may arise at the request of the driver or at the request of the vehicle (i.e., the autonomous driving device).

Meanwhile, while the driving mode is switched, the driver may feel a discomfort for driving. Accordingly, there is a need for a technology that minimizes the discomfort felt by the driver while the driving mode is switched.

Meanwhile, in the case that obstacles appear in the vicinity of the autonomous driving vehicle, there may be more stable for the driver to directly manipulate a steering wheel to avoid obstacles. Accordingly, there is a demand for a technology for improving the driving stability by rapidly changing a driving mode.

DETAILED DESCRIPTION OF INVENTION

Technical Problem

In this background, an object of the present disclosure is to provide a driving mode switching device and a driving mode switching method capable of improving driving stability and preventing safety accidents by rapidly changing the driving mode even in case of an emergency.

In addition, an object of the present disclosure is to provide a driving mode switching device and a driving mode switching method capable of minimizing the discomfort by adjusting the transition section of the driving mode.

Technical Solution

In order to solve the above problems, in one aspect, the present disclosure provides a driving mode switching device including a driving mode switching determination unit configured to determine to switch a driving mode of a host vehicle to either an autonomous driving mode or a manual driving mode based on at least one of driving information, detection information and driver detection information, and a driving mode switching unit configured to adjust a transition section in which the driving mode is switched and/or the ratio of turning control signals in the driving modes based on at least one of the driving information, the detection information and the driver detection information when it is determined that the driving mode is to be switched, and to switch the driving mode by changing the turning control signal.

In another aspect, the present disclosure provides a driving mode switching method including determining to switch a driving mode of a host vehicle to either an autonomous driving mode or a manual driving mode based on at least one of driving information, detection information and driver detection information, and adjusting a transition section in which the driving mode is switched and/or a degree of change of a turning control signal in the driving mode based on at least one of the driving information, the detection information and the driver detection information when it is determined that the driving mode is to be switched, and switching the driving mode by changing the turning control signal.

Advantageous Effects

According to an embodiment of the present disclosure, it is possible to provide a driving mode switching device and a driving mode switching method for improving driving safety and preventing safety accidents by rapidly changing driving modes even in case of emergency.

In addition, according to an embodiment of the present disclosure, it is possible to provide a driving mode switching device and a driving mode switching method capable of minimizing the discomfort by adjusting the transition section of the driving mode.

MODE FOR DISCLOSURE

Hereinafter, it will be described embodiments of the present disclosure in detail with reference to exemplary drawings. Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that an element "is connected to", "is coupled to", or "contacts" the other element, it should be interpreted that, not only can the element is directly connected to, directly coupled to, or directly contact the other element, but another element can also be interposed between the element and the other element.

Figure 1:
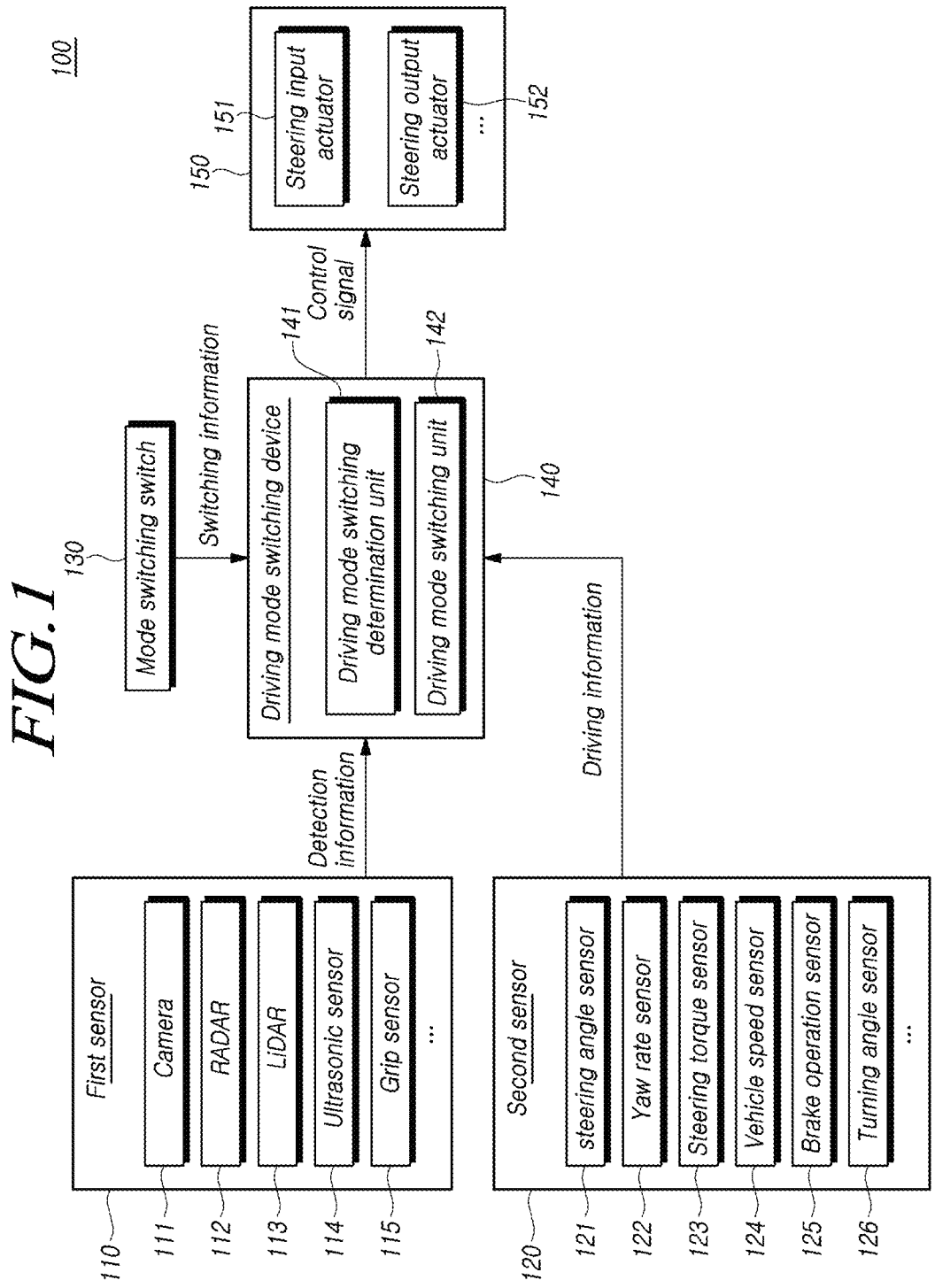
FIG. 1 is a block diagram for explaining a driving mode switching system according to the present disclosure.

FIG. 1 is a block diagram for explaining a driving mode switching system 100 according to the present disclosure.

Referring to FIG. 1, the driving mode switching system 100 according to the present disclosure may refer to a system for switching a driving mode between an autonomous driving mode and a manual driving mode. Specifically, when a specific condition occurs, such as an abnormality occurs in a host vehicle capable of being driven in the autonomous driving mode or the manual driving mode, or the driver's condition is abnormal, the driving mode switching system 100 may switch from the autonomous driving mode to the manual driving mode, or may switch from the manual driving mode to the autonomous driving mode.

Here, the autonomous driving mode may mean a mode including both partially autonomous driving and fully autonomous driving.

The driving mode switching system 100 may include a first sensor 110, a second sensor 120, a mode switching switch 130, a driving mode switching device 140, an actuator 150, and the like.

The first sensor 110 may detect the surroundings of the host vehicle, and output detection information corresponding to the detection result to the driving mode switching device 140. For example, the first sensor 110 detects an object in the vicinity of the host vehicle, and outputs detection information on the detected object to the driving mode switching device 140. However, the present invention is not limited thereto.

Meanwhile, the first sensor 110 may detect the interior of the host vehicle and output detection information corresponding to the detection result to the driving mode switching device 140. For example, the first sensor 110 detects a driver existing in the interior of the host vehicle, and outputs detected information about the detected driver to the driving mode switching device 140, however, is not limited thereto.

Here, the detection target may exist in various ways. For example, the temperature outside and inside the host vehicle may be a detection target, and a movement, eye blinking or gaze, heart rate, and the like of a driver in the interior of the host vehicle, may be the detection target. However, the present invention is not limited thereto.

The first sensor 110 may be disposed outside the host vehicle, or may be disposed inside the host vehicle.

The first sensor 110 may be, for example, a camera 111, a radar 112, a lidar 113, an ultrasonic sensor 114, a grip sensor 115, and a temperature sensor. However, the present invention is not limited thereto.

Here, the grip sensor 115 may mean a sensor for detecting whether a steering wheel (not shown) disposed on the host vehicle is gripped, a driver's heart rate, or the like.

The second sensor 120 may detect the driving state of the host vehicle, and output driving information corresponding to the detection result to the driving mode switching device 140. For example, the second sensor 120 may detect a steering angle of a steering wheel (not shown) and output steering angle information to the driving mode switching device 140. As another example, the second sensor 120 may detect a vehicle speed of the host vehicle and output vehicle speed information to the driving mode switching device 140. However, the present invention is not limited thereto.

The second sensor 120 may include, for example, a steering angle sensor 121, a yaw rate sensor 122, a steering torque sensor 123 for detecting torque generated by rotation of a steering wheel, and a vehicle speed sensor 124, a brake operation sensor 125, a turning angle sensor 126 for detecting a turning angle of the wheel, and the like. However, the present invention is not limited thereto.

Here, as an example, the brake operation sensor 125 detects the operation of a brake by detecting a brake pedal pressure generated by the driver directly pressing the brake pedal in the host vehicle that is autonomously or manually driven. As another example, the brake operation sensor 125 detects the operation of the brake by detecting an autonomous emergency braking (AEB) operation in the autonomously or manually driven host vehicle. However, the present invention is not limited thereto.

The mode switching switch 130 may output switching information instructing to change the driving mode to the driving mode switching device 140. The mode switching switch 130 may be operated by an input such as a user. For example, when a driver riding in the autonomous driving vehicle presses the mode switching switch 130, the mode switching switch 130 outputs switching information instructing a command to switch from the autonomous driving mode to the manual driving mode to the driving mode switching device 140. Meanwhile, the switching information may correspond to an electrical signal or a flag.

The driving mode switching device 140 may receive information from at least one of the first sensor 110 and the second sensor 120 to determine the driving mode switching. In addition, when the switching of the driving mode is determined, the driving mode switching device 140 may switch the driving mode by adjusting the control signal in each driving mode for a certain period of time.

The driving mode switching device 140 may include a driving mode switching determination unit 141, a driving mode switching unit 142, and the like.

The driving mode switching determination unit 141 may determine to switch the driving mode of the host vehicle to any one of an autonomous driving mode and a manual driving mode based on at least one of driving information, detection information, and driver detection information.

Here, the detection information may refer to information output by the first sensor 110 to the driving mode switching device 140 by detecting the surroundings of the host vehicle. The driver detection information may refer to information output by the first sensor 110 to the driving mode switching device 140 by detecting a driver located inside the host vehicle. Meanwhile, as described above, the driving information may refer to information output by the second sensor 120.

For example, if the host vehicle autonomously drives without driver intervention, the driving mode switching determination unit 141 checks whether the driver grips a steering wheel in the driver detection information to determine to switch the driving mode to the manual driving mode. A more specific method will be described later, and is not limited to the above-described examples.

As another example, when the driver directly grips the steering wheel to manually drive, the driving mode switching determination unit 141 may check a driver's eye movement from the driver detection information and compare the driver's eye movement with the eye movement in a normal state to determine the driving mode as the autonomous driving mode. A more specific method will be described later, and is not limited to the above-described examples.

The driving mode switching determination unit 141 may use a plurality of detection information as respective detection information to determine driving mode switching, and may integrate the plurality of detection information and determine driving mode switching.

For example, the driving mode switching determination unit 141 may distinguish a lane in which the host vehicle is traveling or a neighboring lane based on the detection information received from the camera, among a plurality of detection information received from the camera 111, the lidar 113, etc. included in the first sensor 110, and may determine the presence or absence of an object in the vicinity of the host vehicle based on the detection information received from the lidar.

As another example, the driving mode switching determination unit 141 may distinguish a lane in which the host vehicle is traveling or a neighboring lane based on a plurality of detection information received from the camera 111, the lidar 113, and the like. In this case, it is possible to determine whether the host vehicle is driving by recognizing the driving lane and the neighboring lane.

If it is determined that the driving mode is to be switched, the driving mode switching unit 142 may control or adjust at least one of a transition section in which the driving mode is switched and a ratio of a turning control signal in driving mode based on at least one of driving information, detection information, and driver detection information, and may switch the driving mode by changing the ratio of the turning control signal.

For example, when it is determined that the driving mode is switched from the autonomous driving mode to the manual driving mode, the driving mode switching unit 142 checks whether the brake is operated from the driving information to change the transition section. Specifically, the driving mode switching unit 142 may adjust the turning control signal in the driving mode during a first transition section if the brake is not operated, and may adjust the turning control signal in the driving mode during a second transition section different from the first transition section if the brake is operated, so that the driving mode is switched. A more specific method will be described later, and is not limited to the above-described examples.

As another example, when it is determined that the driving mode is switched from the manual driving mode to the autonomous driving mode, the driving mode switching unit 142 may change the transition section based on the driver detection information. Specifically, if the driver's condition is normal, the turning control signal in the driving mode is adjusted during the first transition section, and if the driver's condition is abnormal, the turning control signal in the driving mode is adjusted during the second transition section different from the first transition section, so that the driving mode is switched. A more specific method will be described later, and is not limited to the above-described examples.

Here, the turning control signal in the driving mode is a signal for controlling the turning or steering of the wheels, and may mean a control signal for inducing the turning angle of the wheels, the turning torque of the wheels, and the like. Such a turning control signal may be divided into, for example, an autonomous turning control signal and a manual turning control signal. The autonomous turning control signal may refer to a signal for controlling the turning of wheels based on the external environment of the host vehicle when the host vehicle is driving in the autonomous driving mode, and the manual turning control signal may refer to a signal for controlling the turning of a wheel based on a driver's manipulation of a steering wheel when the host vehicle is driving in a manual driving mode.

The driving mode switching device 140 may output a control signal to the actuator 150 when the driving mode switching is performed by determining the driving mode switching. Here, the control signal may include the aforementioned turning control signal, and may include a reaction force torque control signal that provides a feeling of reaction force to the driver. However, the present invention is not limited thereto.

Specifically, when the driving mode is switched from the autonomous driving mode to the manual driving mode, the driving mode switching device 140 may reduce or decrease the autonomous turning control signal so that the host vehicle does not drive (e.g., steers) by the autonomous turning control signal, and may increase the manual turning control signal so that the host vehicle drives (e.g., steers) by the manual turning control signal according to the driver's manipulation of the steering wheel.

Conversely, if the driving mode is switched from the manual driving mode to the autonomous driving mode, the driving mode switching device 140 may increase the autonomous turning control signal so that the host vehicle drives according to the autonomous turning control signal, and may decrease the manual turning control signal.

Meanwhile, if the host vehicle is driving in the autonomous driving mode, in order for the host vehicle to perform the appropriate steering, the driving mode switching device 140 may continuously output the autonomous turning control signal according to the external environment of the host vehicle to the actuator 150 to control the turning of the wheels. In addition, if the host vehicle is driving in the manual driving mode, in order to provide steering assistance to the driver, the driving mode switching device 140 continuously output the manual turning control signal according to the driver's manipulation of the steering wheel to the actuator 150 to control the turning of the wheel. That is, the driving mode switching device 140 may perform a steering control function of the steering control device.

The driving mode switching device 140 may be implemented as an electronic control device such as an electronic control unit (ECU), a microcomputer, or the like.

The actuator 150 may be driven by receiving a control signal from the driving mode switching device 140. Specifically, the actuator 150 may receive a turning control signal from the driving mode switching device 140 to move or turn the wheels, and may receive a reaction force torque control signal from the driving mode switching device 140 to generate a reaction force torque, however, is not limited thereto.

The actuator 150 may include a steering input actuator 151, a steering output actuator 152, etc., and the steering input actuator 151 may include a steering wheel, a shaft, a reaction force motor, etc. The steering output actuator 152 may include a steering motor, a rack, a tie rod, a wheel, and the like. However, the present disclosure is not limited thereto As described above, according to the present disclosure, it is possible to provide driving stability and minimize the discomfort felt by the driver when switching the driving mode by quickly switching the driving mode in an emergency situation.

Hereinafter, it will be described an embodiment of the steering assistance system 200 that can perform the function of the above-described driving mode switching system 100 and assists the steering of the host vehicle.

Figure 2:
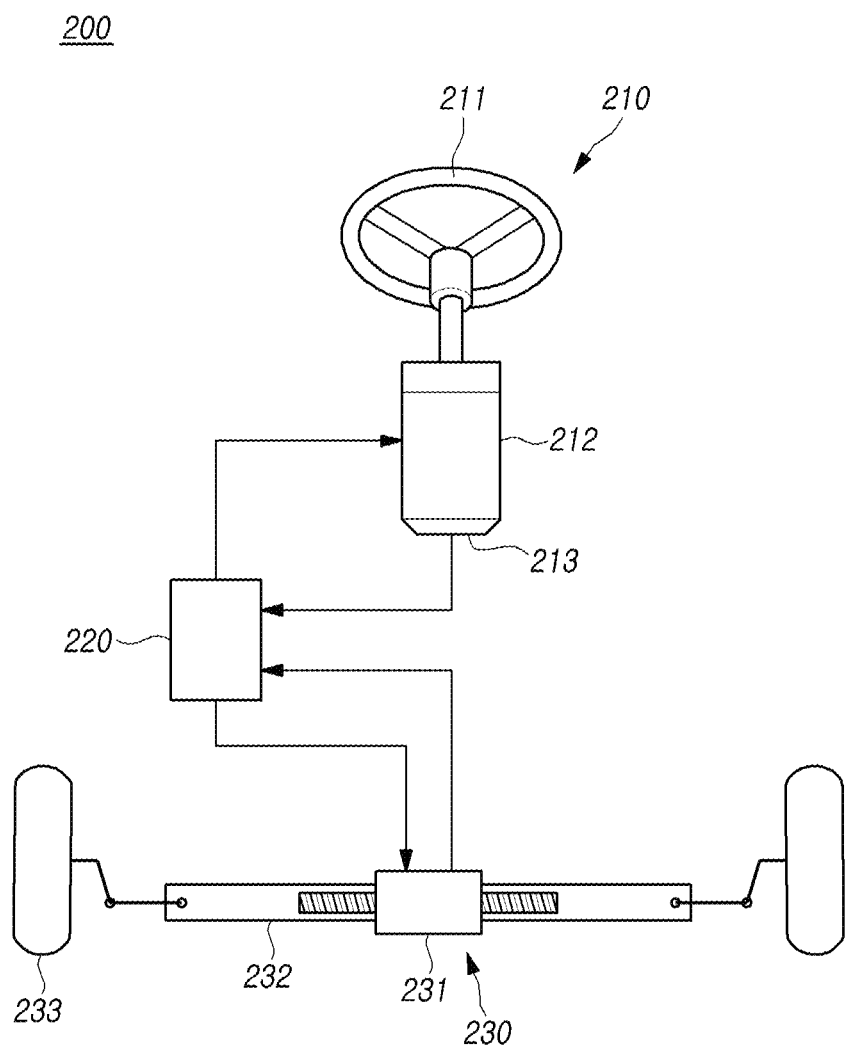
FIG. 2 schematically illustrates a steering assistance system according to the present disclosure.

FIG. 2 schematically illustrates a steering assistance system 200 according to the present disclosure.

Referring to FIG. 2, the steering assistance system 200 according to the present disclosure refers to a system that assists the steering force so that the driver can easily steer in the case of the manual driving mode and performs steering of the host vehicle without the driver's manipulation in the case of the autonomous driving mode.

The steering assistance system 200 may include, depending on the driving manner, a hydraulic power steering (HPS) for generating hydraulic pressure by turning a pump to provide steering assistance, and an electronic power steering (EPS) for providing steering assistance by driving a motor. Hereinafter, the present disclosure will be described with reference to the electric steering assistance system 200 for convenience, but the present disclosure is not limited thereto.

Meanwhile, depending on whether or not the steering input actuator 210 and the steering output actuator 230 are coupled by a mechanical connection member (or linkage), the steering assistance system 200 may be a mechanical system in which force (torque) generated by the driver rotating the steering wheel 211 is transmitted to the steering motor 231 through a mechanical power transmission device (e.g., linkage, etc.) to steer the wheel 233. Alternatively, the steering assistance system 200 may be a steer-by-wire (SbW) system that transmits power by transmitting and receiving electrical signals through wires, cables, etc. instead of a mechanical power transmission device. Hereinafter, the steering assistance system 200 will be described based on the SbW system, but is not limited thereto.

The steering assistance system 200 according to the present disclosure shown in FIG. 2 may include a steering input actuator 210, an electronic control device 220, a steering output actuator 230, and the like. As described above, if the steering assistance system 200 is the SbW system, the steering input actuator 210 and the steering output actuator 230 may be mechanically separated.

The steering input actuator 210 may refer to a device to which steering information intended by a driver is input. As described above, the steering input actuator 210 may include a steering wheel 211, a steering shaft 212 and a reaction force motor 213, and may further include the steering angle sensor 121 and the steering torque sensor 123 as the second sensor 120.

The reaction force motor 213 may receive a control signal (or referred to as a command current) from the electronic control device 220 to apply a reaction force to the steering wheel 211. Specifically, the reaction force motor 213 may receive a command current from the electronic control device 220 and may be driven at a rotation speed indicated by the command current to generate a reaction force torque.

The electronic control device 220 may receive steering information from the steering input actuator 210, calculate a control value, and output an electrical signal indicating the control value to the steering output actuator 230. Here, the steering information may mean information including at least one of a steering angle and a driver's torque.

Meanwhile, the electronic control device 220 may receive the power information actually output from the steering output actuator 230 to calculate a control value, and output an electrical signal indicating the control value to the steering input actuator 210, thereby providing a steering feeling to the driver.

The electronic control device 220 may be implemented as an electronic control unit (ECU), a microcomputer, or the like, similar to the driving mode switching device 140 described above.

The steering output actuator 230 may refer to a device that actually drives the host vehicle to steer. The steering output actuator 230 may include a steering motor 231, a rack 232, a wheel 233, and the like, and may further include a vehicle speed sensor 124 and a rack position sensor as the second sensor 120.

The steering motor 231 may move the rack 232 in the axial direction. Specifically, the steering motor 231 may be driven by receiving a command current from the electronic control device 220, and may cause the rack 232 to linearly move in the axial direction.

The rack 232 may perform a linear motion by driving the steering motor 231, and the wheel 233 may be steered left or right through the linear motion of the rack 232.

Although not shown, the steering assistance system 200 according to the present disclosure may further include a clutch capable of separating or coupling the steering input actuator 210 and the steering output actuator 230. Here, the clutch may be operated under the control of the electronic control device 220.

Meanwhile, in the case that the steering assistance system 200 according to the present disclosure is an SbW system and the host vehicle travels in the autonomous driving mode, the steering assistance system 200 according to the present disclosure may control only the steering output actuator 230 to perform steering control of the host vehicle, or control both the steering input actuator 210 and the steering output actuator 230 to perform steering control of the host vehicle.

Hereinafter, an embodiment of the autonomous driving mode according to the present disclosure will be described in detail.

Figure 3:
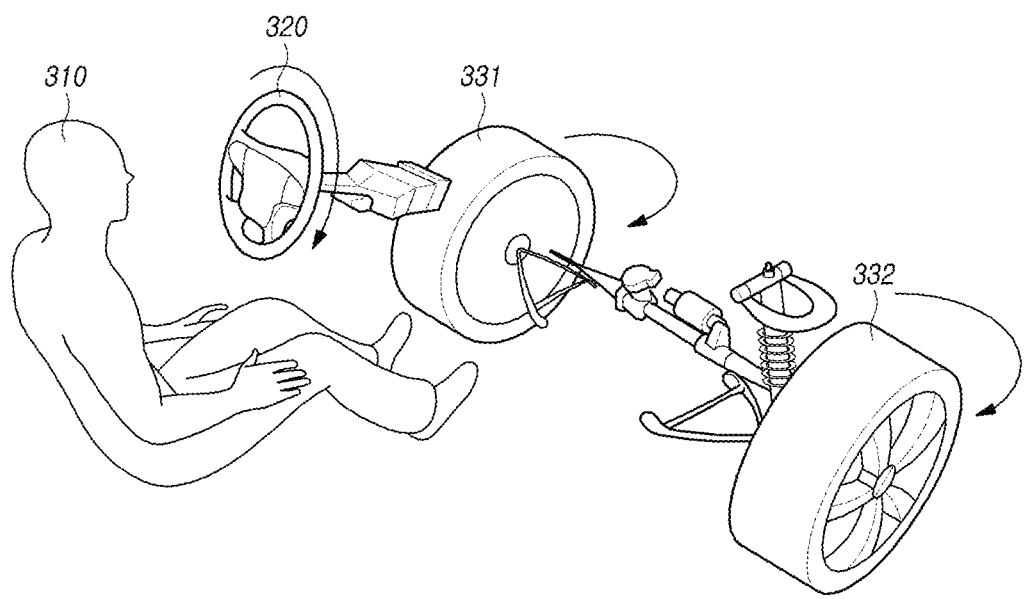
FIG. 3 is a diagram illustrating a first embodiment of an autonomous driving mode operable according to the present disclosure.
Figure 4:
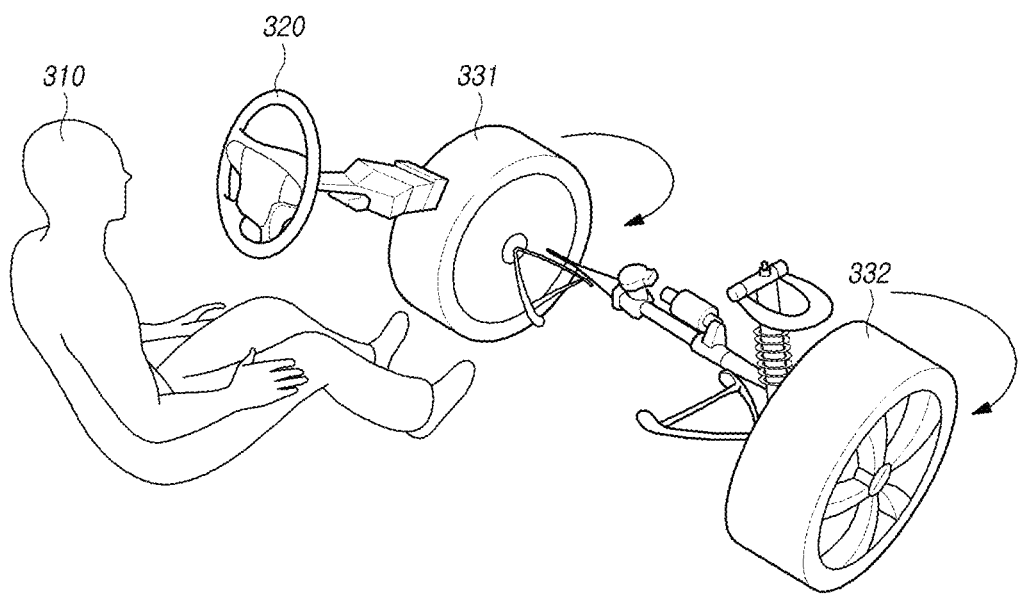
FIG. 4 is a diagram illustrating a second embodiment of an autonomous driving mode operable according to the present disclosure.

FIG. 3 is a diagram illustrating a first embodiment of an autonomous driving mode operable according to the present disclosure, and FIG. 4 is a diagram illustrating a second embodiment of an autonomous driving mode operable according to the present disclosure.

The autonomous driving mode according to the present disclosure may include a mode in which a steering wheel 320 and the wheels 331 and 332 move in the same turning direction, or a mode in which the steering wheel 320 is fixed regardless of the movement and turning direction of the wheels 331 and 332. Such a mode may be selectively implemented according to the selection of a driver 310.

Referring to FIG. 3, for example, if the wheels 331 and 332 included in the autonomous driving vehicle turn right, the steering wheel 320 also turns right. According to the embodiment of the autonomous driving mode, the driver 310 can easily predict the turning direction of the host vehicle only by the rotation of the steering wheel 320.

Meanwhile, with reference to FIG. 4, for example, even if the wheels 331 and 332 included in the autonomous driving vehicle turn right, the steering wheel 320 may be fixed while maintaining a specific rotation angle. Here, the specific rotation angle may be an angle formed when the manual driving mode is switched to the autonomous driving mode, and an angle (e.g., 0 degrees) corresponding to the automatically aligned neutral position when the manual driving mode is switched to the autonomous driving mode. However, the present disclosure is not limited thereto, and preferably, the steering wheel 320 maintains a neutral position. According to this embodiment of the autonomous driving mode, it is possible to save the energy by preventing unnecessary driving of the steering input actuator 151 during autonomous driving, provide convenience to the driver 310 by being distinguished from the manual driving mode, and prevent a phenomenon in which the field of view of the driver 310 is obstructed due to the rotation of the steering wheel 320.

Hereinafter, it will be described a method for determining switching of a driving mode and a method for switching a driving mode according to the present disclosure.

Figure 5A:
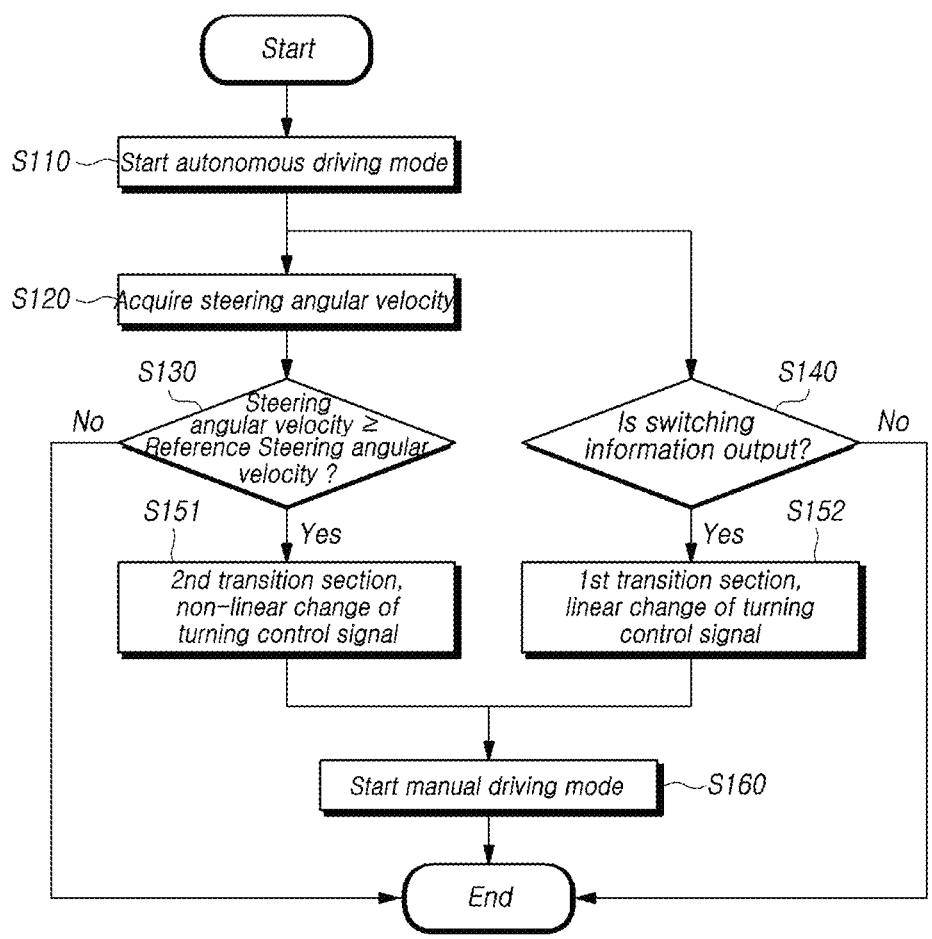
FIGS. 5A and 5B are flowcharts for explaining the first and second embodiments for switching from an autonomous driving mode to a manual driving mode according to the present disclosure.
Figure 5B:
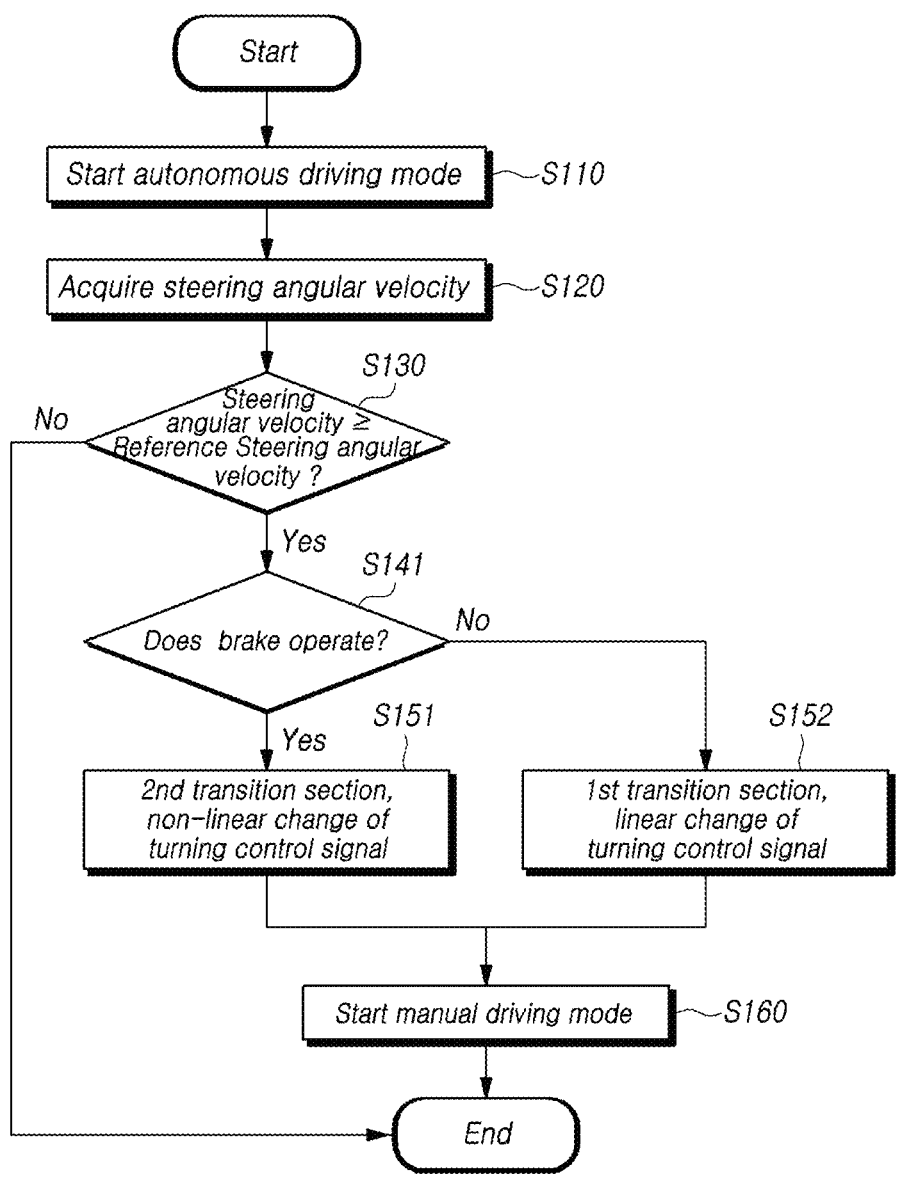

FIGS. 5A and 5B are flowcharts for explaining the first and second embodiments for switching from an autonomous driving mode to a manual driving mode according to the present disclosure.

Referring to FIG. 5A, the driving mode switching device 140 according to the present disclosure may be switched to start the autonomous driving mode by a driver's input in the host vehicle (S110).

If the autonomous driving mode is started, the driving mode switching device 140 according to the present disclosure may acquire a steering angular velocity of the steering wheel from the driving information (S120), and compare the steering angular velocity with a preset reference steering angular velocity (S130). Here, the steering angular velocity may be included in the driving information by differentiating the steering angle detected by the steering angle sensor 121 with respect to time. However, the present disclosure is not limited thereto, and the driving mode switching device 140 may directly differentiate the steering angle with respect to time to obtain the steering angular velocity.

Meanwhile, the driving mode switching device 140 may determine whether switching information is output (S140). Here, the switching information may be information generated by the switch 130 as described above. In a general situation where obstacles do not appear when the host vehicle autonomously drives, the driver can switch the driving mode of the host vehicle at any time by manipulating the switch 130 regardless of the steering angular velocity of the steering wheel, so that the driving mode switching device 140 may monitor whether switching information is output when the autonomous driving mode is started. Meanwhile, if the steering angular velocity is equal to or greater than the reference steering angular velocity, the driving mode switching device 140 may determine to switch the driving mode from the autonomous driving mode to the manual driving mode, and may non-linearly change the turning control signal during the transition section (S151).

If the steering angular velocity is less than the reference steering angular velocity, the driving mode switching device 140 may end the operation. In this case, the driving mode may be maintained as the autonomous driving mode.

Meanwhile, the driving mode switching device 140 may linearly change the turning control signal if the switching information is output (S152), and if the switching information is not output, the driving mode switching device 140 may end the operation. In this case, the driving mode may be maintained as the autonomous driving mode.

Next, the manual driving mode may be started in the host vehicle according to the present disclosure (S160).

Meanwhile, although not shown, the driving mode switching device 140 according to the present disclosure may determine whether an emergency situation is present based on the presence or absence of operation of the brake instead of the method of comparing the steering angular velocity and the reference steering angular velocity, and change the turning control signal.

The first embodiment shown in FIG. 5A may be applied to a situation in which an obstacle suddenly appears when the host vehicle autonomously drives, and the driver quickly manipulates the steering wheel.

As described above, the driving mode switching device 140 according to the present disclosure may provide an effect of preventing a safety accident by rapidly changing the driving mode in a dangerous situation that may occur during driving.

In addition, the driving mode switching device 140 according to the present disclosure may provide an effect of minimizing the discomfort felt by the driver.

Meanwhile, there may be cases in which the steering angular velocity is greater than or equal to the reference steering angular velocity even when the driver does not operate the steering wheel urgently. In this case, it is necessary to prevent the driving mode switching device 140 according to the present disclosure from erroneously changing the driving mode.

Referring to FIG. 5B, steps S110 to S130 are the same as those described above with reference to FIG. 5A, and thus the description thereof will be omitted.

In this case, if the steering angular velocity is less than the reference steering angular velocity, the driving mode switching device 140 may end the operation. In this case, the driving mode may be maintained as the autonomous driving mode. Meanwhile, if the steering angular velocity is equal to or greater than the reference steering angular velocity, the driving mode switching device 140 may determine to change the driving mode from the autonomous driving mode to the manual driving mode.

For example, the driving mode switching determination unit 141 may obtain the steering angular velocity of the steering wheel from the driving information, and may compare the steering angular velocity with a preset reference steering angular velocity.

Further, if the steering angular velocity is equal to or greater than the reference steering angular velocity, the driving mode switching determination unit 141 may determine to switch the autonomous driving mode of the hose vehicle autonomously driving to the manual driving mode.

Then, the driving mode switching device 140 may check whether the brake of the host vehicle operates in the driving information (S141), and may adjust the transition section according to whether the brake is operated or not.

Here, the transition section means a period in which the driving mode is changed or switched, and the brake may be manually operated by the driver or automatically operated by the AEB as described above.

If the brake operates, the driving mode switching device 140 may non-linearly change or adjust the turning control signal during the transition section (S151), and if the brake does not operate, the driving mode switching device 140 may linearly adjust the turning control signal during the transition section (S152).

For example, the driving mode switching unit 142 may check the brake operation information from the driving information, and if the brake of the host vehicle does not operate, may linearly decrease an autonomous turning control signal during the transition section and linearly increase a manual turning control signal. If the brake of the host vehicle operates, the driving mode switching unit 142 may non-linearly decrease the autonomous turning control signal and non-linearly increase the manual turning control signal during the transition section.

Meanwhile, the driving mode switching device 140 may adjust the transition section instead of the change form of the turning control signal in the driving mode according to whether or not the brake is operated. That is, if the brake operates, the driving mode switching device 140 may adjust the turning control signal by adjusting the transition section to a second transition section (S151). If the brake is not operated, the driving mode switching device 140 may adjust (or set) the transition section as a first transition section to adjust the turning control signal (S152).

Here, the first transition section may be a default value set when the driver commands to change the driving mode with the mode switching switch 130, and the second transition section may mean a value set to a shorter period than the first transition section in order to quickly switch the driving mode in preparation for an emergency situation.

For example, the driving mode switching unit 142 may check whether the brake is operated from the driving information, and if the brake of the host vehicle does not operate, may decrease or reduce the autonomous turning control signal during the first transition section and increase the manual turning control signal. If the brake of the host vehicle operates, the driving mode switching unit 142 may adjust the transition section to a second transition section shorter than the first transition section, and may decrease the autonomous turning control signal and increase the manual turning control signal during the second transition section.

Meanwhile, the driving mode switching device 140 may adjust both the transition section and the change form of the turning control signal as needed.

In addition, the driving mode switching device 140 according to the present disclosure may switch to start the manual driving mode in the host vehicle (S160).

Meanwhile, although not shown, in the second embodiment shown in FIG. 5B, the step S141 may be preceded first and then step S130 may be performed since the driver may first operate the brake or the autonomous driving vehicle may perform AEB first in an emergency situation. That is, the driving mode switching device 140 according to the present disclosure may determine whether the brake of the host vehicle operates (S141) and compare the steering angular velocity with the reference steering angular velocity (S130). In addition, the driving mode switching device may change the turning control signal according to the result of the two steps (S151, S152).

As described above, the driving mode switching device 140 according to the present disclosure may provide an effect of preventing a malfunction in the driving mode switching by checking the emergency situation in stages.

Hereinafter, it will be described an embodiment of adjusting the transition section an embodiment of adjusting the turning control signal in detail by illustrating a graph.

Figure 6:
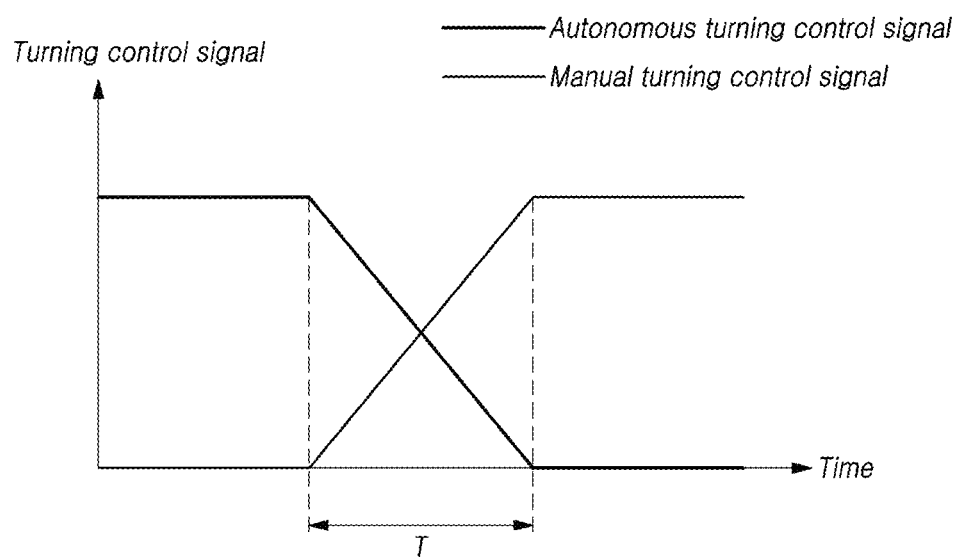
FIG. 6 is a first graph of a turning control signal changed when a driving mode is switched according to the present disclosure.
Figure 7:
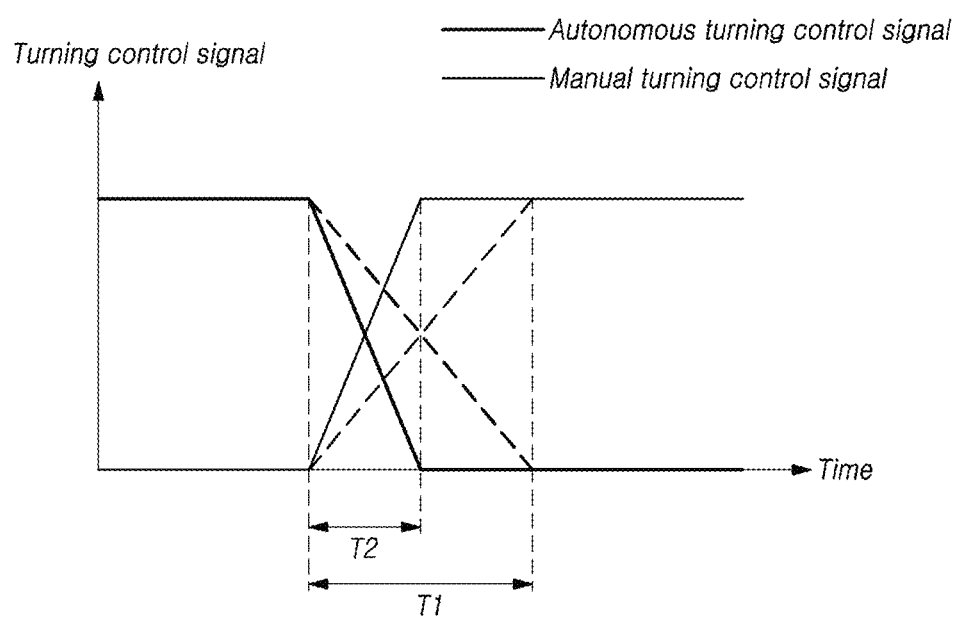
FIG. 7 is a second graph of a turning control signal changed when a driving mode is switched according to the present disclosure.
Figure 8:
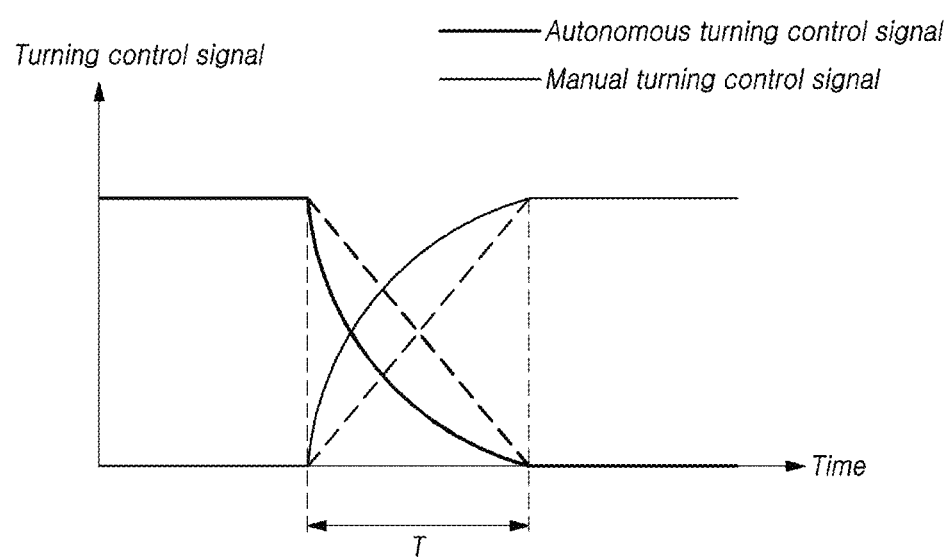
FIG. 8 is a third graph of a turning control signal changed when a driving mode is switched according to the present disclosure.

FIG. 6 is a first graph of a turning control signal changed when a driving mode is switched according to the present disclosure, FIG. 7 is a second graph of a turning control signal changed when a driving mode is switched according to the present disclosure, and FIG. 8 is a third graph of a turning control signal changed when a driving mode is switched according to the present disclosure.

If the driver generates a mode switching command using the mode switching switch 130, the driving mode switching device 140 may linearly change the turning control signal in the driving mode during the transition section T.

Referring to FIG. 6, for example, if it is determined that the driving mode is switched from the autonomous driving mode to the manual driving mode, the autonomous turning control signal may have a specific ratio (e.g., 100%) which is determined based on the external environment of the host vehicle before the transition section T, may decrease linearly during the transition section T, and may be maintained at 0 (zero) after the transition section T elapses.

Meanwhile, the manual turning control signal may be maintained at 0 (zero) before the transition section T, may increase linearly during the transition section T, and may have a specific value (e.g., 100%) determined based on the driver's manipulation of the steering wheel after the transition section T has elapsed.

Meanwhile, if an unexpected obstacle is detected on the outside of the host vehicle, the driver generally operates the brake. In this case, in order for the driver to directly manipulate the steering wheel to perform the evasive steering, it is required to quickly change from the autonomous driving mode to the manual driving mode, so that the transition section is required to be set shorter than the transition section shown in FIG. 6.

Referring to FIG. 7, for example, in the case of a general situation in which the driver issues a mode change command using the mode switching switch 130, the driving mode switching device 140 may adjust the autonomous turning control signal during the first transition section T1.

However, if the driver operates on the brake or the AEB operates due to the unexpected appearance of an obstacle, the driving mode switching device 140 may adjust the transition section to a second transition section T2 that is shorter than the first transition section T1. In this case, the autonomous turning control signal may be linearly decreased during the second transition section T2, and the manual turning control signal may be linearly increased during the second transition section T2.

Meanwhile, as described above, there may be adjusted the degree of a change in the ratio of the turning control signal instead of the transition section.

Referring to FIG. 8, for example, while the driving mode is switched, the autonomous turning control signal may be non-linearly decreased according to a first graph in which a magnitude of a slope is gradually decreased.

At the same time, while the driving mode is switched, the manual turning control signal may be non-linearly increased according to a second graph in which a magnitude of a slope is gradually decreased.

Although not shown, in case of an emergency, the driving mode switching device 140 may not only non-linearly change the turning control signal as shown in FIG. 8, but also decrease a transition section as shown in FIG. 7.

As described above, the driving mode switching device 140 according to the present disclosure can prevent a safety accident by controlling to quickly change the driving mode when a dangerous situation occurs during autonomous driving.

Meanwhile, there may be cases in which the driver rapidly manipulated the steering wheel. In this case, if the difference between the steering angle of the steering wheel and the turning angle of the wheel is large, the driver may feel a large sense of heterogeneity when the driving mode is switched.

Figure 9:
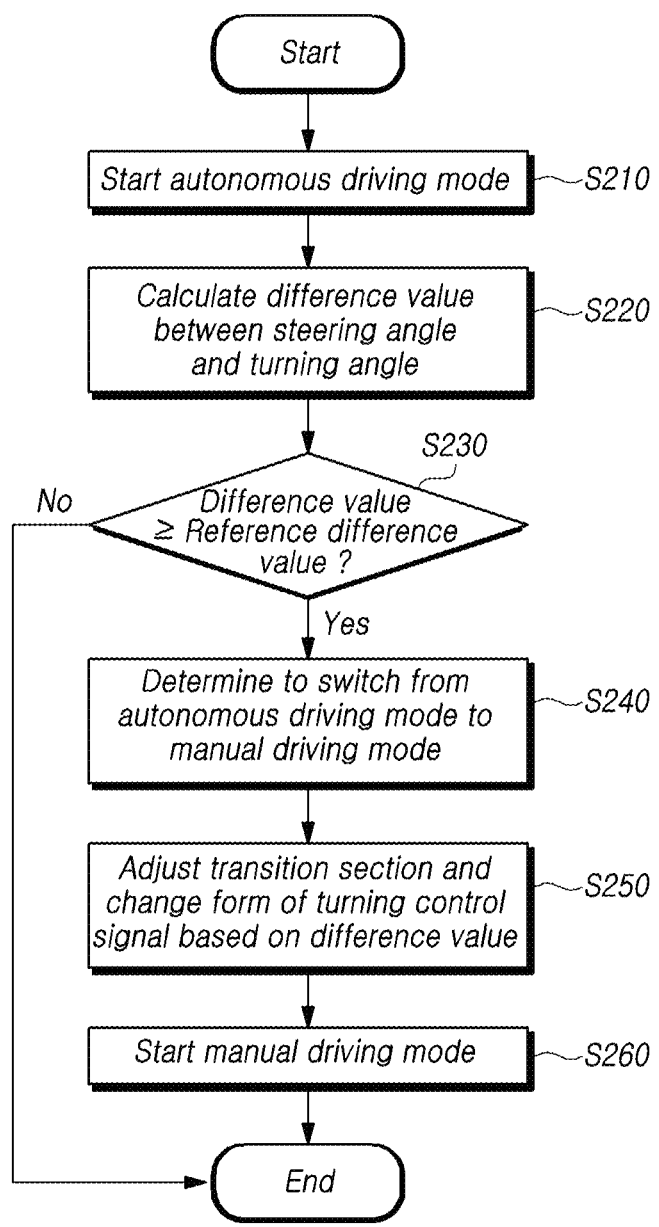
FIG. 9 is a flowchart for explaining a third embodiment of switching from an autonomous driving mode to a manual driving mode according to the present disclosure.

FIG. 9 is a flowchart for explaining a third embodiment of switching from an autonomous driving mode to a manual driving mode according to the present disclosure.

Referring to FIG. 9, the driving mode switching device 140 according to the present disclosure may be controlled to start the autonomous driving mode in the host vehicle by a driver's input (S210).

If the autonomous driving mode is started, the driving mode switching device 140 according to the present disclosure may acquire a steering angle and a turning angle from the driving information, calculate a difference value between the steering angle and the turning angle (S220), and compare the difference value with a preset reference difference value (S230).

In this case, if the difference value is equal to or greater than the reference difference value, the driving mode switching device 140 may determine to switch the driving mode from the autonomous driving mode to the manual driving mode (S240). On the other hand, if the difference value is less than the reference difference value, the driving mode switching device 140 may end the operation. In this case, the driving mode may be maintained as the autonomous driving mode.

For example, the driving mode switching determination unit 141 may obtain a steering angle of a steering wheel and a turning angle of a wheel from the driving information, and calculate a difference value between the steering angle and the turning angle.

If the difference value is equal to or greater than the preset reference difference value, the driving mode switching determination unit 141 may determine to switch the autonomous driving mode of the autonomous driving host vehicle to the manual driving mode.

Next, the driving mode switching device 140 may adjust at least one of a transition section and a change form of the turning control signal based on the difference value (S250).

For example, the driving mode switching unit 142 may adjust the transition section based on the difference value between the steering angle and the turning angle, and may decrease the autonomous turning control signal and increase the manual turning control signal during the adjusted transition section.

Here, if the difference value is increased, the transition section may be increased. That is, although not directly illustrated, similarly to that illustrated in FIG. 7, the transition section T may be expanded or reduced according to the difference value.

Next, the manual driving mode may be started in the host vehicle according to the present disclosure (S170).

Meanwhile, the change form of the turning control signal may also be adjusted according to the difference value between the steering angle and the turning angle. Hereinafter, it will be described an embodiment for adjusting the turning control signal according to a difference value between the steering angle and the turning angle in detail by using a graph.

Figure 10:
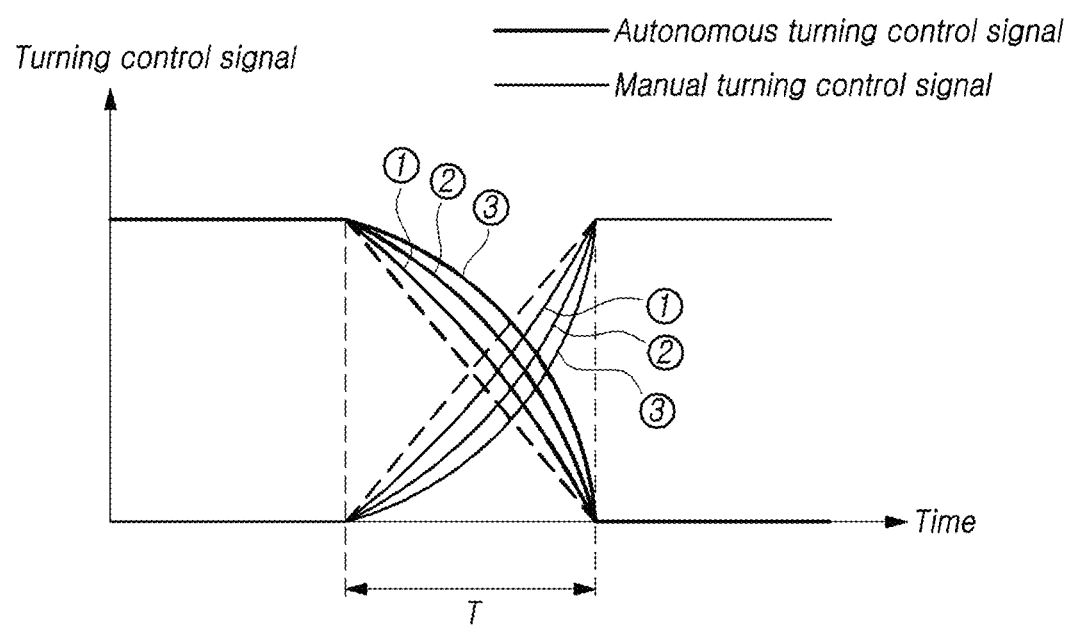
FIG. 10 is a fourth graph of a turning control signal changed when a driving mode is switched according to the present disclosure.

FIG. 10 is a fourth graph of a turning control signal changed when a driving mode is switched according to the present disclosure.

The driving mode switching unit 142 included in the driving mode switching device 140 according to the present disclosure may reduce or decrease the autonomous turning control signal during the transition section according to a third graph in which the magnitude of the slope of the autonomous turning control signal increases, and may increase the manual turning control signal during the transition section according to the fourth graph in which the magnitude of the slope of the manual turning control signal is increased.

Referring to FIG. 10, for example, the third graph has a shape that is convex to the upper right compared to a straight graph. In the case of the third graph, as time elapses, the magnitude of the slope, which is the amount of change (or the differential value of the autonomous turning control signal) of the autonomous turning control signal per unit time, gradually increases.

In addition, the third graph may be a graph in which the amount of change in the slope of the autonomous turning control signal increases as the difference value between the steering angle and the turning angle increases. Specifically, as the difference value increases, the third graph may be more convex. That is, if the difference value increases, the curve shape of the third graph may change from ① to ③.

Continuing to refer to FIG. 10, for example, the fourth graph may have a graph shape that is convex to the lower right compared to a straight graph. In the case of the fourth graph, as time elapses, the magnitude of the slope, which is the amount of change (or the differential value of the manual turning control signal) of the manual turning control signal per unit time, may gradually increase.

In addition, the fourth graph may be a graph in which the amount of change in the slope of the manual turning control signal increases as the difference value between the steering angle and the turning angle increases. Specifically, as the difference value increases, the fourth graph may become more convex. That is, if the difference value increases, the shape of the curve of the fourth graph may change from ① to ③ in the same way as in the third graph.

Although not shown, the driving mode switching device 140 may also adjust the transition section in the same manner as described above with reference to FIG. 9 while adjusting the change form of the turning control signal.

As described above, the driving mode switching device 140 according to the present disclosure may minimize the discomfort felt by the driver when switching the driving mode by adjusting the transition section in which the driving mode is switched.

Meanwhile, in the case that the driver rotates the steering wheel in a direction opposite to the turning direction of the wheel, the driver may feel a sense of heterogeneity due to the change of the driving mode more greatly.

Therefore, for simple and quick operation processing, there is required to determine whether the rotation direction of the steering wheel coincides with the turning direction of the wheel, and to adjust the transition section and the change form of the turning control signal when switching the driving mode.

Figure 11:
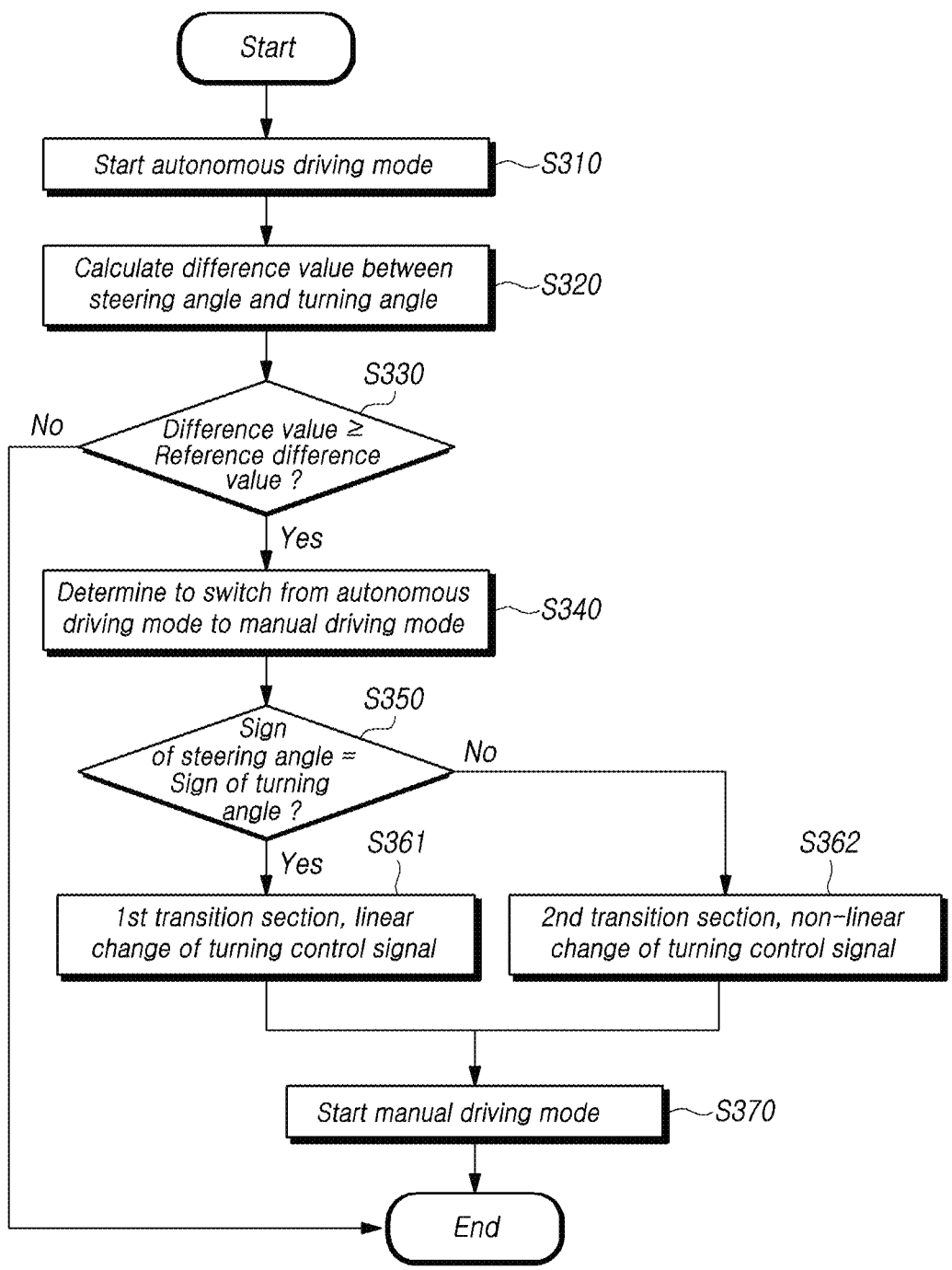
FIG. 11 is a flowchart for explaining a fourth embodiment of switching from an autonomous driving mode to a manual driving mode according to the present disclosure.

FIG. 11 is a flowchart for explaining a fourth embodiment of switching from an autonomous driving mode to a manual driving mode according to the present disclosure.

Referring to FIG. 11, as described above with reference to FIG. 10, the autonomous driving mode may be initiated by a driver's input or the like in the host vehicle according to the present disclosure (S310). In addition, the driving mode switching device 140 according to the present disclosure may calculate a difference value between the steering angle and the turning angle (S320), compare the difference value with the reference difference value (S330), and determine to switch the driving mode according to the comparison result (S340).

Here, when it is determined to switch the driving mode, the driving mode switching device 140 may determine whether the sign of the steering angle coincides with the sign of the turning angle (S350). This is to compare the rotation direction of the steering wheel and the turning direction of the wheel. The rotation direction of the steering wheel and the turning direction of each wheel can be mathematically expressed using a sign. And, similarly, the direction of the steering angle and the turning angle occurred by the rotation of the steering wheel and wheel may also be expressed using a mathematical sign.

If the sign of the steering angle and the sign of the turning angle are matched, the driving mode switching device 140 may adjust the transition section to a first transition section, and/or may change the turning control signal linearly. If the sign of the steering angle and the sign of the turning angle do not match, the driving mode switching device 140 may adjust the transition section to a second transition section, and/or may non-linearly change the turning control signal.

For example, the driving mode switching unit 142 compares the sign of the steering angle and the sign of the turning angle. If the sign of the steering angle coincides with the sign of the turning angle, the driving mode switching unit 142 may decrease the autonomous turning control signal and increase the manual turning control signal during the first transition section. If the sign of the steering angle does not coincide with the sign of the turning angle, the driving mode switching unit 142 may adjust the transition section to a second transition section longer than the first transition section, and may decrease the autonomous turning control signal and increase the manual turning control signal during the second transition section.

As another example, the driving mode switching unit 142 may compare the sign of the steering angle and the sign of the turning angle. If the sign of the steering angle and the sign of the turning angle match, the driving mode switching unit 142 may linearly decrease the autonomous turning control signal and linearly increase the manual turning control signal during the transition section. If the sign of the steering angle and the sign of the turning angle do not match, the driving mode switching unit 142 may non-linearly decrease the autonomous turning control signal and non-linearly increase the manual turning control signal during the transition section.

Here, if the sign of the steering angle coincides with the sign of the turning angle, the autonomous turning control signal and the manual turning control signal may be linearly changed similarly to those shown in FIGS. 6 and 7.

Meanwhile, similarly as shown in FIG. 10, if the sign of the steering angle and the sign of the turning angle do not match, the autonomous turning control signal may be non-linearly decreased while the driving mode is switched according to the third graph in which the magnitude of the slope is increased.

Similarly, similarly as shown in FIG. 10, if the sign of the steering angle and the sign of the steering angle do not match, the manual turning control signal may be non-linearly increased while the driving mode is switched according to the fourth graph in which the magnitude of the slope is increased.

As described above, the driving mode switching device 140 according to the present disclosure can minimize the discomfort or the sense of heterogeneity felt by the driver in switching the driving mode while increasing the calculation speed.

Meanwhile, as described above with reference to FIG. 4, in the autonomous driving mode according to the present disclosure, the vehicle may autonomously travel with the steering wheel fixed regardless of the movement of the wheel. In this case, the driver may feel a greater discomfort when switching the driving mode than a case of autonomously driving while the steering wheel moves together with the movement of the wheel.

Hereinafter, it will be described in detail a method of determining whether to switch the driving mode and a method of switching the driving mode in the case that the vehicle autonomously drives while the steering wheel is fixed regardless of the movement of the wheel.

Figure 12:
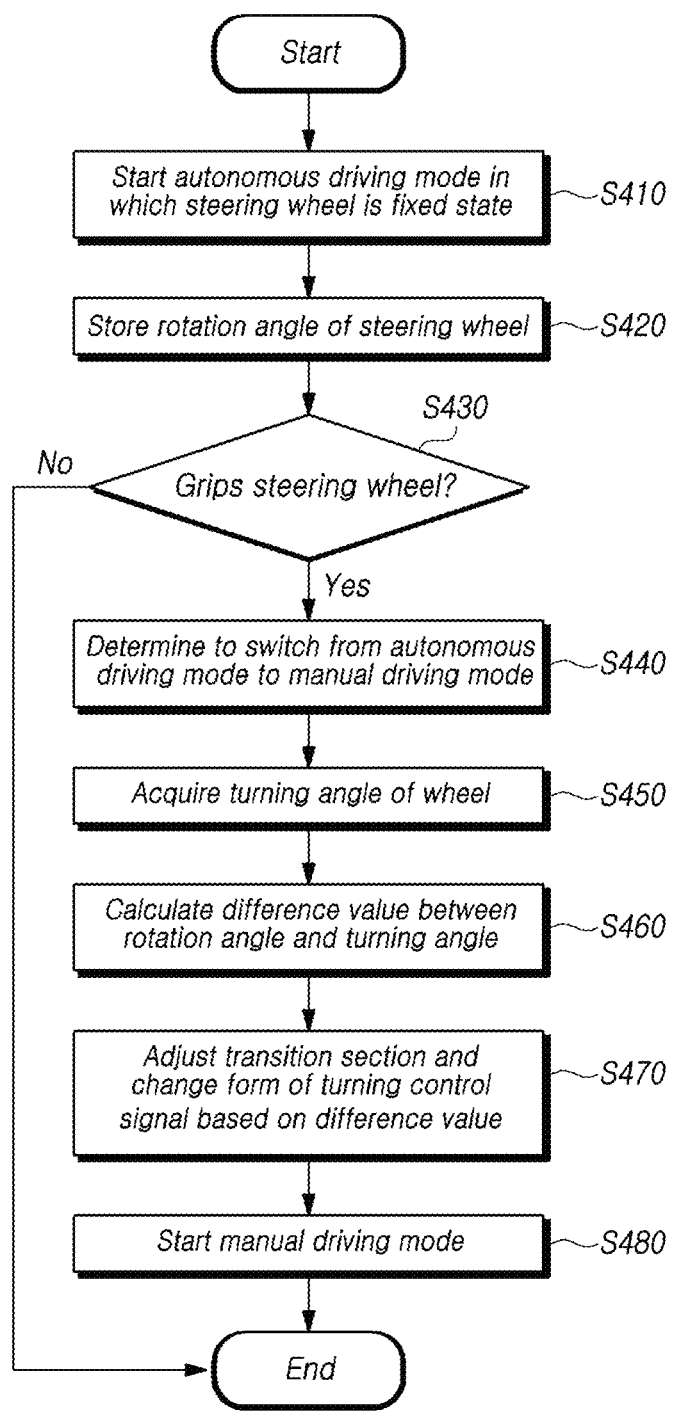
FIG. 12 is a flowchart for explaining a fifth embodiment of switching from an autonomous driving mode to a manual driving mode according to the present disclosure.

FIG. 12 is a flowchart for explaining a fifth embodiment of switching from an autonomous driving mode to a manual driving mode according to the present disclosure.

Referring to FIG. 12, the autonomous driving mode according to the present disclosure may be started as a mode in which the vehicle autonomously drives while the steering wheel is fixed as shown in FIG. 4 (S410).

In this case, the driving mode switching device 140 according to the present disclosure may store the rotation angle of the steering wheel detected by the second sensor 120 when the autonomous driving mode as shown in FIG. 4 is started (S420).

For example, if the host vehicle starts autonomous driving, the driving mode switching unit 142 may acquire a rotation angle of the steering wheel from driving information and stores it in advance. In this case, if the steering wheel is fixed to the neutral position, the pre-stored rotation angle is 0. However, the present disclosure is not limited thereto.

Thereafter, the driving mode switching device 140 according to the present disclosure may determine whether the driver grips the steering wheel (S430). In detail, the driving mode switching device 140 may determine whether the driver grips the steering wheel through detection information detected by the grip sensor 115, which is the second sensor 120.

If it is determined that the driver grips the steering wheel, the driving mode switching device 140 may determine to change the driving mode from the autonomous driving mode to the manual driving mode (S440). Meanwhile, if it is determined that the driver does not grip the steering wheel, the driving mode switching device 140 may end the operation. In this case, the driving mode may be maintained as the autonomous driving mode.

For example, if the rotation angle of the steering wheel is constantly maintained regardless of the turning angle of the wheel when the host vehicle autonomously drives, the driving mode switching determination unit 141 may determine whether the driver grips the steering wheel based on the driver detection information. If it is determined that the driver grips the steering wheel, the driving mode switching determination unit 141 may determine to switch the autonomous driving mode of the host vehicle to the manual driving mode.

Next, the driving mode switching device 140 may acquire the turning angle of the wheel from the driving information (S450). Specifically, the driving mode switching device 140 may acquire the turning angle of the wheel just before determining that the autonomous driving mode is switched to the manual driving mode. Then, the driving mode switching device 140 may calculate a difference value between the pre-stored rotation angle of the steering wheel and the turning angle of the wheel (S460), and may adjust at least one of a transition section and a change form of the turning control signal based on the above-described difference value (S470).

For example, before the autonomous driving mode is switched to the manual driving mode, the driving mode switching unit 142 may acquire the turning angle of the wheel from the driving information, may adjust the transition section based on a difference between the pre-stored rotation angle and the turning angle, and may decrease the autonomous turning control signal and increase the manual turning control signal during the adjusted transition section.

As another example, before the autonomous driving mode is switched to the manual driving mode, the driving mode switching unit 142 may acquire the turning angle of the wheel from the driving information, may adjust the turning control signal according to a graph determined based on a difference value between the pre-stored rotation angle and the turning angle. In this case, the driving mode switching unit 142 may decrease the autonomous turning control signal during the transition section according to the third graph in which the magnitude of the slope of the autonomous turning control signal increases, and increase the manual turning control signal during the transition section according to the fourth graph in which the magnitude of the slope of the manual turning control signal is increased.

Here, the third graph and the fourth graph may be the same as those shown in FIG. 10, and similarly as described above, the third graph may be a graph in which the amount of change in the slope of the autonomous turning control signal increases as the difference value between the rotation angle and the turning angle increases. In addition, the fourth graph may be a graph in which the amount of change in the slope of the manual turning control signal increases as the difference value between the rotation angle and the turning angle increases.

As described above, the driving mode switching device 140 according to the present disclosure can minimize the sense of heterogeneity felt by the driver when switching the driving mode by adjusting the transition section in which the driving mode is switched and/or the ratio of the turning control signals.

Meanwhile, in case of an emergency, such as when the driver drives drowsy or the driver's health condition deteriorates, there may be required to quickly switch from the manual driving mode to the autonomous driving mode.

Figure 13:
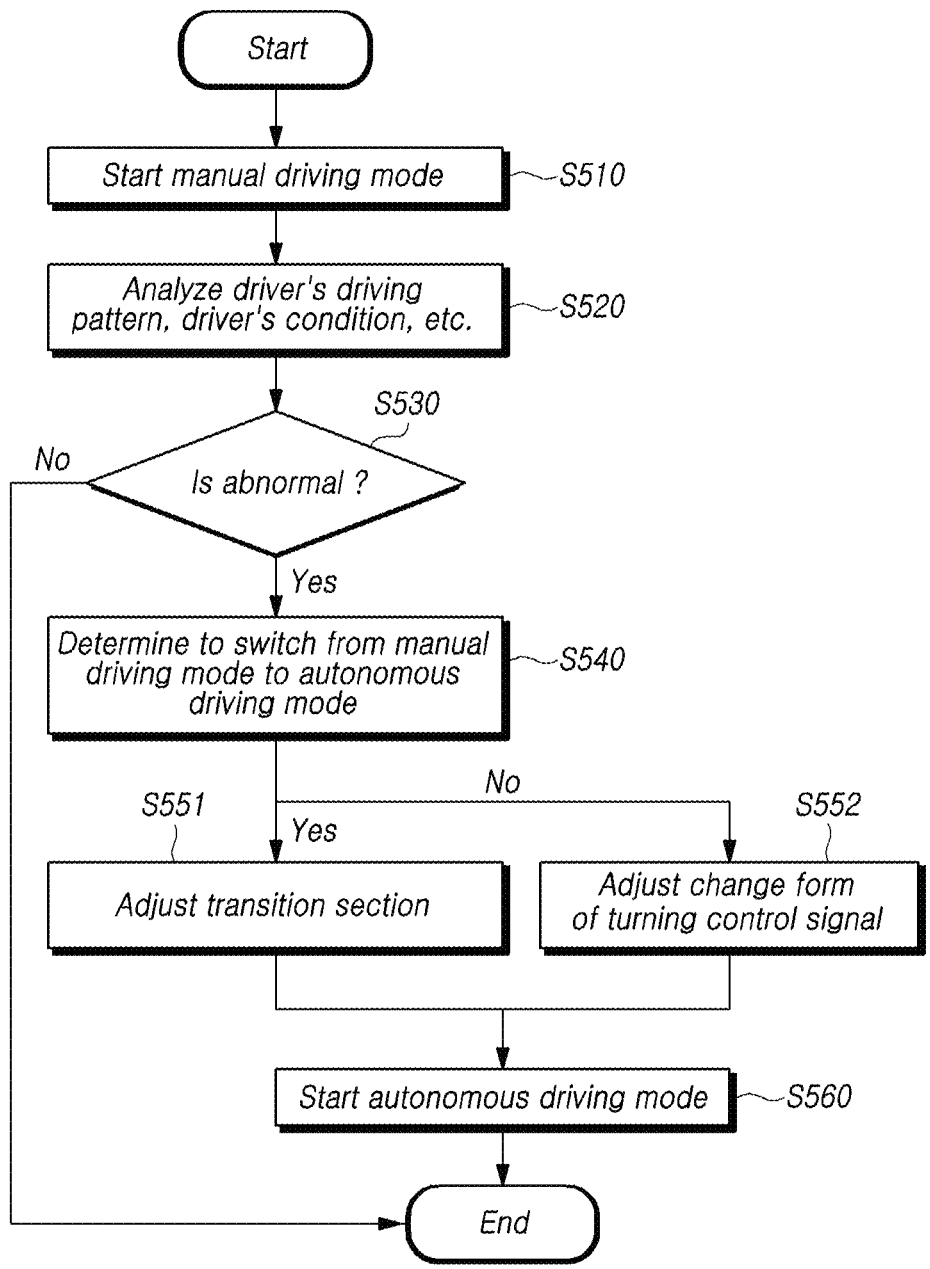
FIG. 13 is a flowchart for explaining a first embodiment of switching from a manual driving mode to an autonomous driving mode according to the present disclosure.

FIG. 13 is a flowchart for explaining a first embodiment of switching from a manual driving mode to an autonomous driving mode according to the present disclosure.

Referring to FIG. 13, the driving mode switching device 140 according to the present disclosure may control to start the manual driving mode (S510). As described above, the manual driving mode may be initiated by the driver's input, or the driving mode switching described above with reference to FIGS. 5 to 11.

The driving mode switching device 140 may analyze the driving pattern of the driver, the driver's condition or state, and the like (S520). In addition, if the driving pattern of the driver or the driver's condition is abnormal (S530), the driving mode switching device 140 may determine to switch from the manual driving mode to the autonomous driving mode (S540).

Here, the driving mode switching device 140 may analyze only the driving pattern of the driver, may analyze only the driver's condition, or may analyze both the driving pattern of the driver and the driver's condition.

For example, the driving mode switching determination unit 141 may analyze the driving pattern of the driver based on the driving information, and as a result of the analysis, if the driving pattern of the driver is abnormal, may determine to switch the manual driving mode of the host vehicle, which is manually driving, to the autonomous driving mode.

Specifically, the driving mode switching determination unit 141 may measure the number of times the direction (or sign) of the steering angle and the turning angle changes for a unit time in the driving information, and if the measured number is greater than or equal to a preset reference number, may determine that the driving pattern of the driver is abnormal. However, the present disclosure is not limited thereto.

As another example, the driving mode switching determination unit 141 may obtain at least one of the driver's eye movement and the driver's heart rate from the driver detection information, analyze the driver's condition. If the driver's condition is abnormal as a result of the analysis, the driving mode switching determination unit may determine to switch the manual driving mode of the host vehicle, which is manually driving, to the autonomous driving mode.

Specifically, the camera 111, which is the first sensor 110 installed inside, may detect an iris region in the driver's face area, perform a calculation for the iris center point, and may output to the driving mode switching device 140 by including the calculation result in the driver detection information. The driving mode switching determination unit 141 may compare the movement of the center point of the iris with a preset normal movement pattern, and if the movement of the center point of the iris does not match the normal movement pattern, may determine that the driver's condition is abnormal.

Here, as the method of detecting the iris region, the image captured by the first sensor 110 may be processed as a binary transformed image, the image may be segmented again, and the iris region may be detected using R, G, and B color differences. In addition, there may be used a method of setting the iris region through a region of interest (ROI) region. However, the present disclosure is not limited thereto.

In addition to the above-described example, if the camera 111, which is the first sensor 110, detects the open/closed state of the driver's eye, and if the eye is not opened for a unit time, the driving mode switching device 140 may determine that the driver's condition is abnormal.

As another example, the grip sensor 115, which is the first sensor 110, may detect the heart rate of the driver who grips the steering wheel. The driving mode switching determination unit 141 may obtain the driver's heart rate from the driver detection information, compare the driver's heart rate with a preset normal heart rate, and if the difference between the driver's heart rate and the normal heart rate is not included in the preset error range, may determine that the driver's condition is abnormal. However, the present disclosure is not limited thereto.

If it is determined to switch the driving mode, the driving mode switching device 140 may adjust the transition section (S551). Meanwhile, the driving mode switching device 140 may adjust the change form of the turning control signal (S552). In steps S551 and S552, one of the steps may be selectively performed similarly to the above, or the two steps may be performed simultaneously or asynchronously.

First, if it is determined to switch the driving mode based on the driving pattern of the driver, for example, the driving mode switching unit 142 may adjust the transition section to a second transition section shorter than the first transition section corresponding to the case where the driving pattern of the driver is normal, and may increase the autonomous turning control signal and decrease the manual turning control signal during the second transition section. In this case, the first transition section and the second transition section may be expressed similarly to that illustrated in FIG. 7.

As another example, the driving mode switching unit 142 may increase the autonomous turning control signal during the transition section according to the first graph in which the magnitude of the slope of the autonomous turning control signal is decreased, and may decrease the manual turning control signal during the transition section according to the second graph in which the magnitude of the slope of the manual turning control signal is decreased. In this case, the first graph and the second graph may be expressed similarly to that shown in FIG. 8.

Meanwhile, for example, if it is determined to switch the driving mode based on the driver's condition, the driving mode switching unit 142 may adjust the transition section to a second transition section shorter than the first transition section corresponding to the case where the driver's condition is normal, and may increase the autonomous turning control signal and decrease the manual turning control signal during the second transition section. In this case, the first transition section and the second transition section may be expressed similarly to that illustrated in FIG. 7.

As another example, the driving mode switching unit 142 may increase the autonomous turning control signal during the transition section according to the first graph in which the magnitude of the slope of the autonomous turning control signal is decreased, and may decrease the manual turning control signal during the transition section according to the second graph in which the magnitude of the slope of the manual turning control signal is decreased. In this case, the first graph and the second graph may be expressed similarly to that shown in FIG. 8.

Thereafter, the driving mode switching device 140 according to the present disclosure may be controlled to start in the autonomous driving mode (S560).

Meanwhile, the driving mode switching device 140 may determine to switch from the manual driving mode to the autonomous driving mode based on whether the driver grips steering wheel, so that the calculation procedure for determining the switching of the driving mode can be more simplified.

Figure 14:
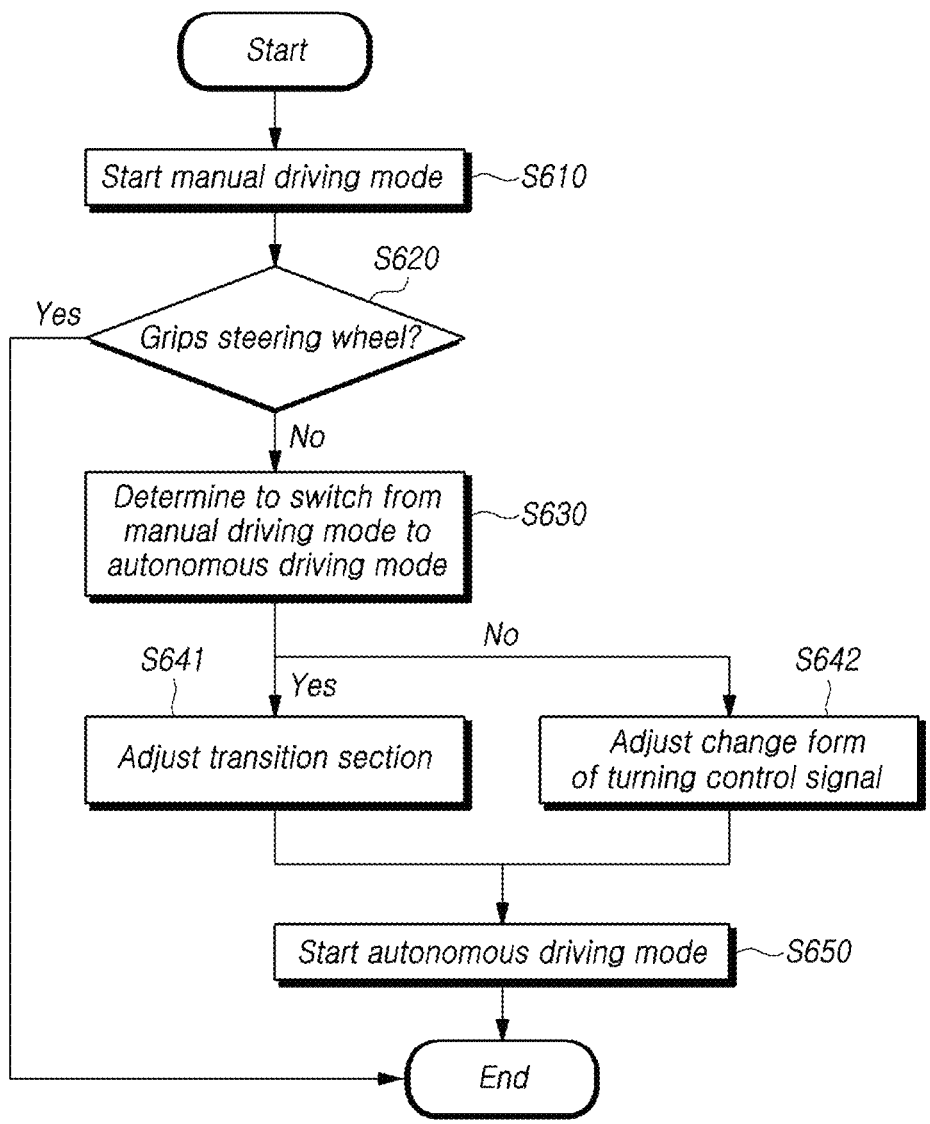
FIG. 14 is a flowchart for explaining a second embodiment of switching from a manual driving mode to an autonomous driving mode according to the present disclosure.

FIG. 14 is a flowchart for explaining a second embodiment of switching from a manual driving mode to an autonomous driving mode according to the present disclosure.

Referring to FIG. 14, the manual driving mode according to the present disclosure is started (S610), and the driving mode switching device 140 according to the present disclosure may check whether the driver grips the steering wheel based on the driver detection information (S620). If the driver does not grip or hold on the steering wheel, the driving mode switching device 140 may determine to switch from the manual driving mode to the autonomous driving mode (S630).

For example, the driving mode switching determination unit 141 may determine whether the driver does not grip the steering wheel based on the driver detection information when the host vehicle is manually driving. In addition, if it is determined that the driver does not grip the steering wheel, the driving mode switching determination unit 141 may determine to switch the manual driving mode of the host vehicle to the autonomous driving mode.

If it is determined to switch the driving mode, the driving mode switching device 140 may adjust the transition section (S641). Alternatively, the driving mode switching device 140 may adjust the change form of the turning control signal (S642). As described above with reference to FIG. 13, steps S641 and S642 may be selectively performed or performed together.

For example, the driving mode switching unit 142 may increase the autonomous turning control signal during the transition section according to the third graph in which the magnitude of the slope of the autonomous turning control signal increases, and may decrease the manual turning control signal during the transition section according to the fourth graph in which the magnitude of the slope of the manual turning control signal increases. In this case, the third graph and the fourth graph may be represented similarly to those shown in FIG. 10.

As described above, the driving mode switching device 140 according to the present disclosure may minimize the discomfort or sense of heterogeneity felt by the driver when switching the driving mode while increasing the calculation speed.

Hereinafter, it will be described a driving mode switching method capable of performing all of the above-described present disclosure.

Figure 15:
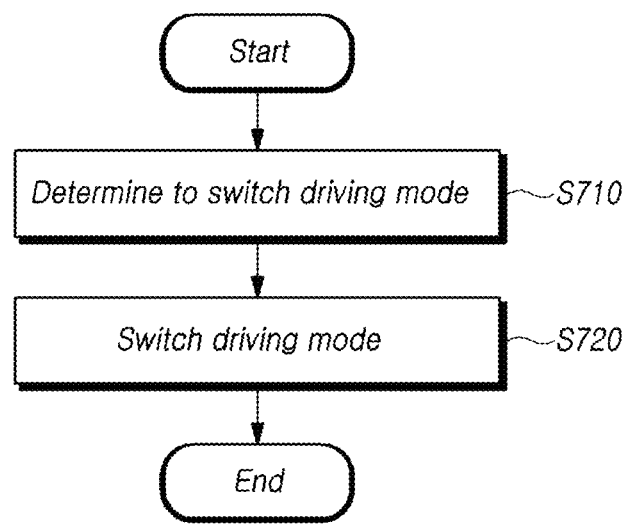
FIG. 15 is a flowchart for explaining a driving mode switching method according to the present disclosure.

FIG. 15 is a flowchart for explaining a driving mode switching method according to the present disclosure.

Referring to FIG. 15, the driving mode switching method according to the present disclosure may include determining to switch a driving mode of a host vehicle to either an autonomous driving mode or a manual driving mode based on at least one of driving information, detection information and driver detection information (S710), and adjusting a transition section in which the driving mode is switched and/or a degree of change of a turning control signal in the driving mode based on at least one of the driving information, the detection information and the driver detection information when it is determined that the driving mode is to be switched, and switching the driving mode by changing the turning control signal (S720).

As described above, according to an embodiment of the present disclosure, it is possible to provide a driving mode switching device and a driving mode switching method for improving driving safety and preventing safety accidents by rapidly changing driving modes even in case of emergency.

In addition, according to an embodiment of the present disclosure, it is possible to provide a driving mode switching device and a driving mode switching method capable of minimizing the discomfort by adjusting the transition section of the driving mode.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATION

This patent application claims priority in accordance with Article 119(a) of the U.S. Patent Law (35 USC § 119(a)) for Patent Application No. 10-2019-0126608 filed in Korea on Oct. 14, 2019, which all contents are incorporated into this patent application by reference. In addition, if this patent application claims priority for countries other than the United States for the same reason as above, all the contents are incorporated into this patent application as references.

The invention claimed is:

1. A driving mode switching device comprising an electronic control unit having:
 a first portion operating as a driving mode switching determination unit, configured to determine to switch a driving mode of a host vehicle to either an autonomous driving mode or a manual driving mode based on at least one of driving information, detection information and driver detection information; and
 a second portion operating as a driving mode switching unit configured to adjust a ratio of an autonomous turning control signal and a manual turning control signal in the driving modes based on at least one of the driving information, the detection information and the driver detection information when it is determined that the driving mode is to be switched, and to switch the driving mode by changing the ratio of the autonomous turning control signal and the manual turning control signal.

2. The driving mode switching device of claim 1, wherein the portion of the electronic control unit operating as a driving mode switching determination unit acquires a steering angular velocity of a steering wheel from the driving information and compares the steering angular velocity with a preset reference steering angular velocity, wherein, if the steering angular velocity is equal to or greater than the reference steering angular velocity, the driving mode switching determination unit determines to switch the autonomous driving mode of a host vehicle autonomously driving to the manual driving mode.

3. The driving mode switching device of claim 2, wherein the portion of the electronic control unit operating as a driving mode switching unit is configured to: check whether a brake is operated from the driving information, decrease the autonomous turning control signal and increase the manual turning control signal during a first transition section, if the brake of the host vehicle does not operate, and adjust the transition section to a second transition section shorter than the first transition section, and decrease the autonomous turning control signal and increase the manual turning control signal during the second transition section, if the brake of the host vehicle operates.

4. The driving mode switching device of claim 2, wherein the portion of the electronic control unit operating as a driving mode switching unit is configured to: check whether a brake is operated from the driving information, linearly decrease the autonomous turning control signal and linearly increase a manual turning control signal during the transition section, if the brake of the host vehicle does not operate, and non-linearly decrease the autonomous turning control signal and non-linearly increase the manual turning control signal during the transition section, if the brake of the host vehicle operates.

5. The driving mode switching device of claim 4, wherein the autonomous turning control signal is non-linearly decreased according to a first graph in which a magnitude of a slope gradually decreases while the driving mode is switched, wherein the manual turning control signal is non-linearly increased according to a second graph in which a magnitude of a slope gradually decreases while the driving mode is switched.

6. The driving mode switching device of claim 1, wherein the portion of the electronic control unit operating as a driving mode switching determination unit is configured to: acquire a steering angle of a steering wheel and a turning angle of a wheel from the driving information and calculate a difference value between the steering angle and the turning angle, and determine to switch the autonomous driving mode of the host vehicle autonomously driving to the manual driving mode if the difference value is equal to or greater than a preset reference difference value.

7. The driving mode switching device of claim 6, wherein the portion of the electronic control unit operating as a driving mode switching unit is configured to: adjust the transition section based on the difference between the steering angle and the turning angle, and decrease an autonomous turning control signal and increase a manual turning control signal during the adjusted transition section.

8. The driving mode switching device of claim 6, wherein the portion of the electronic control unit operating as a driving mode switching unit is configured to: decrease an autonomous turning control signal according to a third graph in which a magnitude of a slope of the autonomous turning control signal increases during the transition section, and increase a manual turning control signal according to a fourth graph in which a magnitude of a slope of the manual turning control signal increases during the transition section.

9. The driving mode switching device of claim 8, wherein the third graph is a graph in which the amount of change in the slope of the autonomous turning control signal increases as the difference value increases, wherein the fourth graph is a graph in which the amount of change in the slope of the manual turning control signal increases as the difference value increases.

10. The driving mode switching device of claim 6, wherein the portion of the electronic control unit operating as a driving mode switching unit is configured to: compare a sign of the steering angle with a sign of the turning angle, if the sign of the steering angle coincides with the sign of the turning angle, decrease an autonomous turning control signal and increases a manual turning control signal during a first transition section, and, if the sign of the steering angle does not coincide with the sign of the turning angle, adjust the transition section to a second transition section longer than the first transition section, and decrease the autonomous turning control signal and increase the manual turning control signal during the second transition section.

11. The driving mode switching device of claim 6, wherein the portion of the electronic control unit operating as a driving mode switching unit is configured to: compare a sign of the steering angle with a sign of the turning angle, if the sign of the steering angle coincides with the sign of the turning angle, linearly decrease an autonomous turning control signal and linearly increase a manual turning control signal during the transition section, and, if the sign of the steering angle does not coincide with the sign of the turning angle, non-linearly decrease the autonomous turning control signal and non-linearly increase the manual turning control signal during the transition section.

12. The driving mode switching device of claim 11, wherein the autonomous turning control signal is non-linearly decreased according to a third graph in which a magnitude of a slope increases while the driving mode is switched, wherein the manual turning control signal is non-linearly increased according to a fourth graph in which a magnitude of a slope increases while the driving mode is switched.

13. The driving mode switching device of claim 1, wherein the portion of the electronic control unit operating as a driving mode switching determination unit is configured to: if a rotation angle of a steering wheel is maintained constant regardless of a turning angle of a wheel when a host vehicle autonomously drives, determine whether a driver grips the steering wheel based on the driver detection information, and when determined that the driver grips the steering wheel, determine to switch the autonomous driving mode of the host vehicle to the manual driving mode.

14. The driving mode switching device of claim 13, wherein the portion of the electronic control unit operating as a driving mode switching unit is configured to: acquire and store the rotation angle from the driving information in advance when the host vehicle starts the autonomous driving, acquire the turning angle of the wheel from the driving information before the autonomous driving mode is switched to the manual driving mode, adjust the transition section based on a difference value between the rotation angle and the turning angle, and decrease an autonomous turning control signal and increase a manual turning control signal during the adjusted transition section.

15. The driving mode switching device of claim 13, wherein the portion of the electronic control unit operating as a driving mode switching unit is configured to: acquire and store the rotation angle from the driving information in advance when the host vehicle starts the autonomous driving, acquire the turning angle of the wheel from the driving information before the autonomous driving mode is switched to the manual driving mode, adjust the turning control signal according to a graph determined based on a difference value between the rotation angle and the turning angle, decrease an autonomous turning control signal according to a third graph in which a magnitude of a slope of the autonomous turning control signal increases during the transition section, and increase a manual turning control signal according to a fourth graph in which a magnitude of a slope of the manual turning control signal increases during the transition section.

16. The driving mode switching device of claim 15, wherein the third graph is a graph in which the amount of change in the slope of the autonomous turning control signal increases as the difference value increases, wherein the fourth graph is a graph in which the amount of change in the slope of the manual turning control signal increases as the difference value increases.

17. The driving mode switching device of claim 1, wherein the portion of the electronic control unit operating as a driving mode switching determination unit is configured to: acquire at least one of an eye movement of a driver and a heart rate of the driver from the driver detection information and analyze a condition of the driver, and if the condition of the driver is abnormal as a result of the analysis, determine to switch the manual driving mode of a host vehicle manually driving to the autonomous driving mode.

18. The driving mode switching device of claim 17, wherein the portion of the electronic control unit operating as a driving mode switching unit is configured to: adjust the transition section to a second transition section shorter than a first transition section corresponding to a case in which the condition of the driver is normal, and increase an autonomous turning control signal and decrease a manual turning control signal during the second transition section.

19. The driving mode switching device of claim 17, wherein the portion of the electronic control unit operating as a driving mode switching unit is configured to: increase an autonomous turning control signal according to a first graph in which a magnitude of a slope of the autonomous turning control signal decreases during the transition section, and decrease a manual turning control signal according to a second graph in which a magnitude of a slope of the manual turning control signal decreases during the transition section.

20. A driving mode switching method comprising:
   with a first portion of an electronic control unit of a host vehicle, said electronic control unit arranged to receive at least one of driving information, detection information and driver detection information, determining to switch a driving mode of said host vehicle to either an autonomous driving mode or a manual driving mode based on said at least one of driving information, detection information and driver detection information; and
   with a second portion of said electronic control unit of said host vehicle, adjusting a ratio of an autonomous turning control signal and a manual turning control signal in the driving mode based on at least one of the driving information, the detection information and the driver detection information when it is determined that the driving mode is to be switched, and
   with said second portion of said electronic control unit, switching the driving mode of said host vehicle by changing the ratio of the autonomous turning control signal and the manual turning control turning control signal.

21. A driving mode switching device comprising an electronic control unit having:
   a first portion operating as a driving mode switching determination unit, configured to determine to switch a driving mode of a host vehicle to either an autonomous driving mode or a manual driving mode based on at least one of driving information, detection information and driver detection information; and
   a second portion operating as a driving mode switching unit configured to adjust a transition section in which the driving mode is switched based on at least one of the driving information, the detection information and the driver detection information when it is determined that the driving mode is to be switched, and to switch the driving mode by changing the turning control signal;
   wherein the portion of the electronic control unit operating as a driving mode switching determination unit acquires a steering angular velocity of a steering wheel from the driving information and compares the steering angular velocity with a preset reference steering angular velocity, wherein, if the steering angular velocity is equal to or greater than the reference steering angular velocity, the driving mode switching determination unit determines to switch the autonomous driving mode of a host vehicle autonomously driving to the manual driving mode; or wherein the portion of the electronic control unit operating as a driving mode switching determination unit configured to, acquire a steering angle of a steering wheel and a turning angle of a wheel from the driving information and calculate a difference value between the steering angle and the turning angle, and determine to switch the autonomous driving mode of the host vehicle autonomously driving to the manual driving mode if the difference value is equal to or greater than a preset reference difference value.

22. A driving mode switching device comprising an electronic control unit having:

a first portion operating as a driving mode switching determination unit, configured to determine to switch a driving mode of a host vehicle to either an autonomous driving mode or a manual driving mode based on at least one of driving information, detection information and driver detection information; and a second portion operating as a driving mode switching unit configured to adjust a transition section in which the driving mode is switched based on at least one of the driving information, the detection information and the driver detection information when it is determined that the driving mode is to be switched, and to switch the driving mode by changing the turning control signal;

wherein the portion of the electronic control unit operating as a driving mode switching determination unit is configured to: if a rotation angle of a steering wheel is maintained constant regardless of a turning angle of a wheel when a host vehicle autonomously drives, determine whether a driver grips the steering wheel based on the driver detection information, and when determined that the driver grips the steering wheel, determine to switch the autonomous driving mode of the host vehicle to the manual driving mode; and either wherein the portion of the electronic control unit operating as a driving mode switching unit is configured to: acquire and store the rotation angle from the driving information in advance when the host vehicle starts the autonomous driving, acquire the turning angle of the wheel from the driving information before the autonomous driving mode is switched to the manual driving mode, adjust the transition section based on a difference value between the rotation angle and the turning angle, and decrease an autonomous turning control signal and increase a manual turning control signal during the adjusted transition section;

or wherein the portion of the electronic control unit operating as a driving mode switching unit is configured to: acquire and store the rotation angle from the driving information in advance when the host vehicle starts the autonomous driving, acquire the turning angle of the wheel from the driving information before the autonomous driving mode is switched to the manual driving mode, adjust the turning control signal according to a graph determined based on a difference value between the rotation angle and the turning angle, decrease an autonomous turning control signal according to a third graph in which a magnitude of a slope of the autonomous turning control signal increases during the transition section, and increase a manual turning control signal according to a fourth graph in which a magnitude of a slope of the manual turning control signal increases during the transition section.

* * * * *